United States Patent
Johnson

(10) Patent No.: US 9,113,590 B2
(45) Date of Patent: Aug. 25, 2015

(54) METHODS, APPARATUS, AND SYSTEMS FOR DETERMINING IN-SEASON CROP STATUS IN AN AGRICULTURAL CROP AND ALERTING USERS

(75) Inventor: Jerome Dale Johnson, Waterville, MN (US)

(73) Assignee: Superior Edge, Inc., Mankato, MN (US)

(*) Notice: Subject to any disclaimer, the term of this patent is extended or adjusted under 35 U.S.C. 154(b) by 192 days.

(21) Appl. No.: 13/568,109

(22) Filed: Aug. 6, 2012

(65) Prior Publication Data

US 2014/0035752 A1 Feb. 6, 2014

(51) Int. Cl.
*G01W 1/00* (2006.01)
*A01B 79/00* (2006.01)
*A01G 1/00* (2006.01)

(52) U.S. Cl.
CPC .............. *A01B 79/005* (2013.01); *A01G 1/001* (2013.01)

(58) Field of Classification Search
None
See application file for complete search history.

(56) References Cited

U.S. PATENT DOCUMENTS

| | | | |
|---|---|---|---|
| 4,371,081 A | 2/1983 | Satake | |
| 5,334,987 A | 8/1994 | Teach | |
| 5,361,201 A | 11/1994 | Jost et al. | |
| 5,389,781 A | 2/1995 | Beck | |
| 5,412,219 A | 5/1995 | Chappelle | |
| 5,467,271 A | 11/1995 | Abel | |
| 5,689,418 A | 11/1997 | Monson | |
| 5,751,576 A | 5/1998 | Monson | |
| 5,764,819 A | 6/1998 | Orr | |
| 5,841,883 A | 11/1998 | Kono | |
| 5,845,229 A | 12/1998 | Rawlins | |
| 5,857,174 A | 1/1999 | Dugan | |
| 5,878,371 A | 3/1999 | Hale | |
| 5,913,915 A | 6/1999 | McQuinn | |
| 5,919,242 A | 7/1999 | Greatline | |
| 5,927,603 A | 7/1999 | McNabb | |
| 5,938,709 A | 8/1999 | Hale | |
| 5,999,650 A | 12/1999 | Ligon | |
| 6,014,451 A | 1/2000 | Berry | |
| 6,078,892 A | 6/2000 | Anderson et al. | |
| 6,078,901 A | 6/2000 | Ching | |
| 6,108,590 A | 8/2000 | Hergert | |
| 6,141,614 A | 10/2000 | Janzen | |

(Continued)

FOREIGN PATENT DOCUMENTS

CN 101398317 A * 4/2009

OTHER PUBLICATIONS

Auearunyawat et al., An Automatic Nitrogen Estimation Method in Sugarcane Leaves Using Image Processing Techniques, May 26-27, 2012, International Conference on Agricultural, Environment and Biological Sciences, pp. 39-42.*

*Primary Examiner* — Kerri McNally
*Assistant Examiner* — Kevin Lau
(74) *Attorney, Agent, or Firm* — Kinney & Lange, P.A.

(57) ABSTRACT

A crop's status may be determined from analysis of information regarding the crop received from, for example, a user, an in-season data gathering source, a database, a data feed, an aerial sensor, a UAV, and/or a remote sensor via a communication network. The received data may be compared to, for example, a benchmark, a parameter, a previously determined crop status, and/or a baseline associated with the crop and the comparison may be scored. When the score exceeds a predetermined threshold, an alert may be generated and provided to a user via the communication network.

28 Claims, 13 Drawing Sheets

(56) References Cited

U.S. PATENT DOCUMENTS

| | | | |
|---|---|---|---|
| 6,160,902 A | 12/2000 | Dickson | |
| 6,178,253 B1 * | 1/2001 | Hendrickson et al. | 382/110 |
| 6,178,406 B1 | 1/2001 | Cheetham et al. | |
| 6,199,000 B1 | 3/2001 | Keller | |
| 6,212,824 B1 | 4/2001 | Orr | |
| 6,236,907 B1 | 5/2001 | Hauwiller | |
| 6,336,051 B1 | 1/2002 | Pangels et al. | |
| 6,336,066 B1 | 1/2002 | Pellenc | |
| 6,338,040 B1 | 1/2002 | Buman et al. | |
| RE37,574 E | 3/2002 | Rawlins | |
| 6,366,681 B1 | 4/2002 | Hutchins | |
| 6,401,070 B1 | 6/2002 | McManus et al. | |
| 6,466,321 B1 | 10/2002 | Satake | |
| 6,529,615 B2 | 3/2003 | Hendrickson | |
| 6,549,851 B2 | 4/2003 | Greensides | |
| 6,596,996 B1 | 7/2003 | Stone et al. | |
| 6,597,991 B1 | 7/2003 | Meron | |
| 6,606,542 B2 | 8/2003 | Hauwiller | |
| 6,683,970 B1 | 1/2004 | Satake | |
| 6,721,543 B1 | 4/2004 | Katsura et al. | |
| 6,745,184 B1 | 6/2004 | Choi et al. | |
| 6,750,898 B1 | 6/2004 | Ishida et al. | |
| 6,754,184 B2 | 6/2004 | Kato et al. | |
| 6,813,544 B2 | 11/2004 | Hood | |
| 6,928,434 B1 | 8/2005 | Choi et al. | |
| 6,957,202 B2 | 10/2005 | Skaanning et al. | |
| 6,990,459 B2 | 1/2006 | Schneider | |
| 6,999,877 B1 | 2/2006 | Dyer et al. | |
| 7,039,592 B1 | 5/2006 | Yegge et al. | |
| 7,047,133 B1 | 5/2006 | Dyer et al. | |
| 7,050,910 B1 | 5/2006 | Kleemola et al. | |
| 7,068,816 B1 | 6/2006 | Knoblauch et al. | |
| 7,103,451 B2 | 9/2006 | Seal | |
| 7,123,750 B2 | 10/2006 | Lu et al. | |
| 7,167,800 B2 | 1/2007 | Faivre et al. | |
| 7,184,859 B2 | 2/2007 | Hood | |
| 7,184,892 B1 | 2/2007 | Dyer et al. | |
| 7,203,667 B2 | 4/2007 | Higgins et al. | |
| 7,260,561 B1 | 8/2007 | Heidenreich et al. | |
| 7,349,888 B1 | 3/2008 | Heidenreich et al. | |
| 7,389,181 B2 | 6/2008 | Meadow et al. | |
| 7,412,330 B2 | 8/2008 | Spicer et al. | |
| 7,440,901 B1 | 10/2008 | Dlott et al. | |
| 7,533,069 B2 | 5/2009 | Fairweather | |
| 7,542,958 B1 | 6/2009 | Warren et al. | |
| 7,542,960 B2 | 6/2009 | Basak et al. | |
| 7,555,472 B2 | 6/2009 | Craig et al. | |
| 7,657,124 B2 | 2/2010 | Turner et al. | |
| 7,657,469 B1 | 2/2010 | Yegge et al. | |
| 7,693,765 B2 | 4/2010 | Dell Orfano | |
| 7,725,233 B2 | 5/2010 | Hendrickson et al. | |
| 7,801,759 B1 | 9/2010 | Adams et al. | |
| 7,844,475 B1 | 11/2010 | Murphy | |
| 7,904,332 B1 | 3/2011 | Merkley, Jr. et al. | |
| 7,916,898 B2 | 3/2011 | Anderson | |
| 7,930,085 B2 | 4/2011 | Anderson et al. | |
| 7,991,754 B2 | 8/2011 | Maizel et al. | |
| 8,046,280 B2 | 10/2011 | Avey et al. | |
| 8,046,306 B2 | 10/2011 | Stinson | |
| 8,121,345 B2 | 2/2012 | Jochem et al. | |
| 8,135,178 B2 | 3/2012 | Hendrickson et al. | |
| 8,160,944 B2 | 4/2012 | Orfano | |
| 8,189,877 B2 | 5/2012 | Asner | |
| 8,195,473 B2 | 6/2012 | Myr | |
| 8,196,030 B1 | 6/2012 | Wang et al. | |
| 8,208,680 B2 | 6/2012 | Scharf | |
| 8,229,768 B1 | 7/2012 | Hopkins, III | |
| 8,229,769 B1 | 7/2012 | Hopkins, III | |
| 8,243,997 B2 | 8/2012 | Davis et al. | |
| 8,244,563 B2 | 8/2012 | Coon et al. | |
| 8,249,926 B2 | 8/2012 | Avey et al. | |
| 8,250,481 B2 | 8/2012 | Klaric et al. | |
| 8,335,747 B1 | 12/2012 | Roberts | |
| 8,346,578 B1 | 1/2013 | Hopkins, III et al. | |
| 8,510,195 B2 | 8/2013 | Goslinga et al. | |
| 8,527,301 B2 | 9/2013 | McComb et al. | |
| 2001/0016053 A1 | 8/2001 | Dickson et al. | |
| 2002/0138201 A1 * | 9/2002 | Greensides | 702/2 |
| 2002/0170229 A1 * | 11/2002 | Ton et al. | 47/1.7 |
| 2002/0178229 A1 | 11/2002 | Sinha et al. | |
| 2002/0193928 A1 | 12/2002 | Beck | |
| 2003/0018481 A1 | 1/2003 | Zhou et al. | |
| 2003/0061075 A1 | 3/2003 | Heckman et al. | |
| 2003/0139983 A1 | 7/2003 | Spencer et al. | |
| 2003/0220805 A1 | 11/2003 | Hoffman et al. | |
| 2004/0006736 A1 | 1/2004 | Kawatani | |
| 2004/0021862 A1 | 2/2004 | Panigrahi et al. | |
| 2004/0087317 A1 | 5/2004 | Caci | |
| 2004/0088330 A1 | 5/2004 | Pickett et al. | |
| 2004/0167877 A1 | 8/2004 | Thompson, III | |
| 2005/0027572 A1 | 2/2005 | Goshert | |
| 2005/0075784 A1 | 4/2005 | Gray et al. | |
| 2005/0108343 A1 | 5/2005 | Collet et al. | |
| 2005/0149464 A1 | 7/2005 | Nugent | |
| 2005/0273253 A1 | 12/2005 | Diekhans et al. | |
| 2006/0015360 A1 | 1/2006 | Ochs et al. | |
| 2006/0015374 A1 | 1/2006 | Ochs et al. | |
| 2006/0025927 A1 | 2/2006 | Hoskinson et al. | |
| 2006/0282295 A1 | 12/2006 | McComb et al. | |
| 2006/0282467 A1 | 12/2006 | Peterson et al. | |
| 2006/0287896 A1 | 12/2006 | McComb et al. | |
| 2007/0050382 A1 | 3/2007 | Bugir et al. | |
| 2007/0089390 A1 | 4/2007 | Hendrickson et al. | |
| 2007/0208511 A1 * | 9/2007 | Glenn et al. | 702/2 |
| 2007/0239337 A1 | 10/2007 | Anderson | |
| 2008/0022773 A1 | 1/2008 | McKenna et al. | |
| 2008/0140431 A1 * | 6/2008 | Anderson et al. | 705/1 |
| 2008/0162556 A1 | 7/2008 | McConnell | |
| 2008/0195270 A1 | 8/2008 | Diekhans et al. | |
| 2008/0215203 A1 | 9/2008 | Dix et al. | |
| 2008/0250330 A1 | 10/2008 | Thompson | |
| 2008/0291455 A1 * | 11/2008 | Holland | 356/445 |
| 2009/0024555 A1 | 1/2009 | Rieck et al. | |
| 2009/0043714 A1 | 2/2009 | Zhao et al. | |
| 2009/0150323 A1 | 6/2009 | Hively | |
| 2009/0192956 A1 | 7/2009 | Dejean et al. | |
| 2009/0216594 A1 | 8/2009 | Verhey et al. | |
| 2009/0240516 A1 | 9/2009 | Palestrant | |
| 2009/0322357 A1 | 12/2009 | Beaulieu | |
| 2010/0042234 A1 | 2/2010 | May et al. | |
| 2010/0268390 A1 * | 10/2010 | Anderson | 700/284 |
| 2010/0306012 A1 * | 12/2010 | Zyskowski et al. | 705/8 |
| 2011/0035059 A1 | 2/2011 | Ersavas | |
| 2011/0066337 A1 | 3/2011 | Kormann | |
| 2011/0113030 A1 | 5/2011 | Hunter et al. | |
| 2011/0137456 A1 | 6/2011 | Koselka et al. | |
| 2011/0160994 A1 | 6/2011 | Schmidt et al. | |
| 2011/0196710 A1 | 8/2011 | Rao | |
| 2011/0276336 A1 | 11/2011 | Sweely | |
| 2012/0101634 A1 | 4/2012 | Lindores | |
| 2012/0109387 A1 | 5/2012 | Martin et al. | |
| 2012/0123817 A1 * | 5/2012 | Hohenberger et al. | 705/7.12 |
| 2012/0143633 A1 | 6/2012 | Salghetti et al. | |
| 2013/0013525 A1 | 1/2013 | Dlott et al. | |
| 2013/0018586 A1 | 1/2013 | Peterson et al. | |
| 2013/0093592 A1 * | 4/2013 | Lan et al. | 340/602 |
| 2013/0162390 A1 | 6/2013 | Ersavas et al. | |
| 2013/0168327 A1 * | 7/2013 | Clark | 210/739 |

* cited by examiner

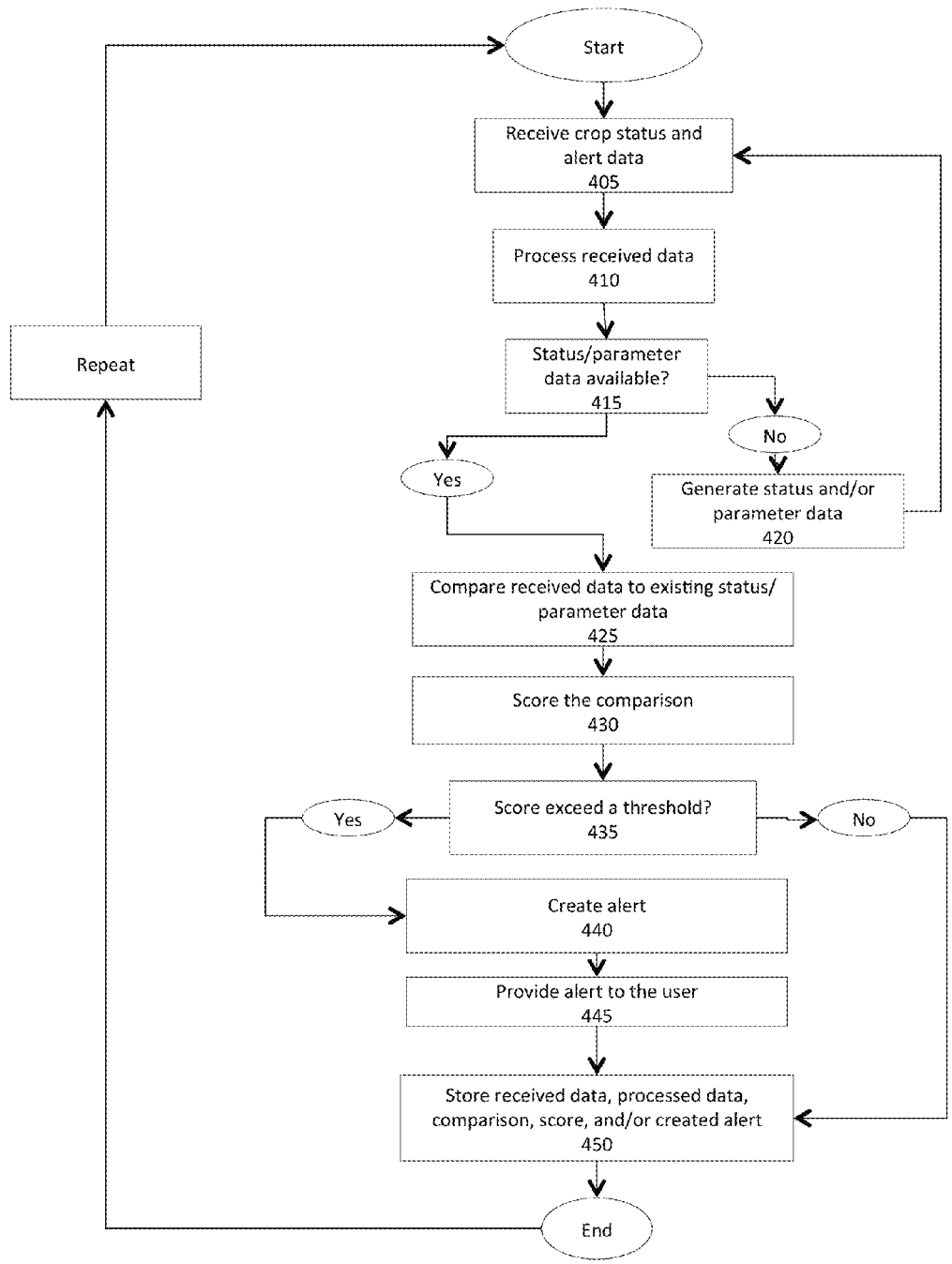

Figure 5A

| Weighting | Factor | Category | Score | | | | Total | Comments | Additional Notes |
|---|---|---|---|---|---|---|---|---|---|
| 3.5 | 3 | Crop Stress | Near Infra Red (NIR) Imagery | Stress Status | | | 6 | Example Comment 1 | Example Additional Notes 1 |
| | | | | None | Minor | Major | | | |
| | | | | 10 | 6 | 2 | | | |
| | | | | | X | | | | |
| | 2 | | Normalized Difference Vegetative (NDVI) Index | Stress Status | | | 6 | Example Comment 2 | Example Additional Notes 2 |
| | | | | None | Minor | Major | | | |
| | | | | 10 | 6 | 2 | | | |
| | | | | | X | | | | |
| | 2 | | Chlorophyll Indices (multiple) | Stress Status | | | 6 | Example Comment 3 | Example Additional Notes 3 |
| | | | | None | Minor | Major | | 262.5 | | |
| | | | | 10 | 6 | 2 | | | |
| | | | | | X | | | | |
| | 2 | | Color Imagery | Stress Status | | | 6 | | Example Additional Notes 4 |
| | | | | None | Minor | Major | | | |
| | | | | 10 | 6 | 2 | | | |
| | | | | | X | | | | |
| | 3 | | Visual Inspection | None | Spotty | Obvious | 7 | Example Comment 4 | Example Additional Notes 5 |
| | | | | 10 | 7 | 4 | | | |
| | | | | | X | | | | |
| 3 | 4 | Fertility | Frequency of Nitrogen Application | Application Split -- Times/Year | | | | 6 | Example Comment 5 | Example Additional Notes 6 |
| | | | | 4 | 3 | 2 | 1 | | | |
| | | | | 10 | 8 | 6 | 4 | | | |
| | | | | | | X | | | | |
| | 2 | | Timing of Nitrogen Application | Primary Application Timing | | | 8 | Example Comment 6 | Example Additional Notes 7 |
| | | | | In-Season | Spring | Fall | | | |
| | | | | 10 | 8 | 8 | | | |
| | | | | | X | | | | |
| | 2 | | Starter Fertilizer | Starter Fertilizer Used | | | 10 | | Example Additional Notes 8 |
| | | | | Yes | No | | | | |
| | | | | 10 | 0 | | | | |
| | | | | X | | | | 306 | | |
| | 2 | | Manure | Frequency (yrs) | | | | 4 | | Example Additional Notes 9 |
| | | | | Yearly | 2 | 4 | Never | | | |
| | | | | 10 | 7 | 4 | 0 | | | |
| | | | | | | X | | | | |
| | 1 | | Residue | Crop Rotation | | | 10 | | Example Additional Notes 10 |
| | | | | C-SB | C-C-SD | Cont Corn | | | |
| | | | | 10 | 8 | 6 | | | |
| | | | | X | | | | | |
| | 3 | | Nitrogen As Applied | Application (Lbs/A) | | | 8 | Example Comment 7 | Example Additional Notes 11 |
| | | | | 180+ | 160-179 | <160 | | | |
| | | | | 10 | 8 | 6 | | | |
| | | | | | X | | | | |
| | | | | | | | 568.5 | | |

500, 505 Weighting, 520 Factor, 525 Category, 530 Score, 535 Total, 540, 545 Comments, 550 Additional Notes, 515, 510

Figure 5B

| Weighting | Factor | Category | Score | | | | | Total | Comments | Additional Notes |
|---|---|---|---|---|---|---|---|---|---|---|
| 2.6 | Soils | Texture | Primary Soil Coverage | | | | | 8 | | Example Additional Notes 1 |
| | | | Loam | Silt | Clay | Sand | | | | |
| | | | 10 | 8 | 6 | 3 | | | | |
| | | | | X | | | | | | |
| | | Soil Variability | Uniformity of Primary Soil | | | | | 8 | | Example Additional Notes 2 |
| | | | > 80% | 60-79% | 40-59% | < 40% | | | | |
| | | | 10 | 8 | 6 | 3 | | | | |
| | | | | X | | | | | | |
| | | Tillage | Tillage | | | | | 8 | | Example Additional Notes 3 |
| | | | Minimum | Conservation | No-Till | Conventional | | | | |
| | | | 10 | 8 | 8 | 7 | | | | |
| | | | | X | | | | 234 | | |
| | | Organic Matter | Organic Matter | | | | | 8 | Example Comment 1 | Example Additional Notes 4 |
| | | | > 5% | 3-5% | 0-2% | | | | | |
| | | | 10 | 8 | 4 | | | | | |
| | | | | X | | | | | | |
| | | pH | Soil pH | | | | | 10 | | Example Additional Notes 5 |
| | | | > 8 | 7.5 - 8 | 6.5 - 7.5 | 6 - 6.5 | < 6 | | | |
| | | | 2 | 4 | 10 | 8 | 4 | | | |
| | | | | | | X | | | | |
| | | Soil Tilth (good soil physical condition with good aeration) | Status | | | | | 6 | | |
| | | | > Aeration | Average | < Aeration | | | | | |
| | | | 10 | 6 | 2 | | | | | |
| | | | X | | | | | | | |
| 2.4 | Drainage | Pot Holes | Percent of Field with Pot Holes | | | | | 8 | Example Comment 2 | Example Additional Notes 6 |
| | | | None | < 5% | 5-10% | 10-20% | > 20% | | | |
| | | | 10 | 8 | 6 | 4 | 0 | | | |
| | | | | X | | | | | | |
| | | Slope | Slope | | | | | 8 | 88.8 | Example Additional Notes 7 |
| | | | < 2% | 2-5% | 6-9% | > 10% | | | | |
| | | | 8 | 10 | 8 | 5 | | | | |
| | | | | X | | | | | | |
| | | Hills | Highly Erodible Soils Based on Presence of Hills | | | | | 5 | | Example Additional Notes 8 |
| | | | None | Minimal | Erodible | | | | | |
| | | | 10 | 5 | 0 | | | | | |
| | | | X | | | | | | | |
| 2.3 | Improvements | Tile | Tile Spacing | | | | | 6 | | Example Additional Notes 9 |
| | | | < 60' Grid | 60-79' Grid | 80-120' Grid | Random | None | | | |
| | | | 10 | 8 | 6 | 4 | 0 | | 55.2 | |
| | | | | | X | | | | | |
| | | Irrigation | Irrigation | | | | | 0 | | Example Additional Notes 10 |
| | | | Yes | No | | | | | | |
| | | | 10 | 0 | | | | | | |
| | | | | X | | | | | | |
| 2.2 | Weather's Impact on Availability | Leaching of Nitrogen | Number of Precipitation Events > 2"/Season | | | | | 4 | Example Comment 3 | Example Additional Notes 11 |
| | | | 0 | 1 | 2 | 3 | 4+ | | | |
| | | | 10 | 8 | 6 | 4 | 2 | | | |
| | | | | | | X | | | | |
| | | Nitrogen Volitization | Number of Precipitation Events > 2"/Season | | | | | 4 | Example Comment 4 | Example Additional Notes 12 |
| | | | 0 | 1 | 2 | 3 | 4+ | | 70.4 | |
| | | | 10 | 8 | 6 | 4 | 2 | | | |
| | | | | | | X | | | | |
| | | Nitrogen Protection | Nitrogen Protection | | | | | 0 | Example Comment 5 | Example Additional Notes 13 |
| | | | Yes | No | | | | | | |
| | | | 10 | 0 | | | | | | |
| | | | | X | | | | | | |
| | | | | | | | | 448.4 | | |

Weighting values per row: 3 (Texture), 2 (Soil Variability), 1 (Tillage), 4 (Organic Matter), 1 (pH), 3 (Soil Tilth), 2 (Pot Holes), 2 (Slope), 1 (Hills), 4 (Tile), 1 (Irrigation), 4 (Leaching of Nitrogen), 4 (Nitrogen Volitization), 3 (Nitrogen Protection).

| Weighting | Factor | Category | Score | | | | | Total | | Comments | Additional Notes |
|---|---|---|---|---|---|---|---|---|---|---|---|
| 2.1 | 3 | Management Practices | Sampling Type | Sample Size & Type | | | | | 8 | 113.4 | | Example Additional Notes 1 |
| | | | | 1 Acre Grid | 2.5 Acre Grid | 4-5 Acre Grid | By Soil Type | By Field | | | | |
| | | | | 10 | 8 | 6 | 3 | 1 | | | | |
| | | | | | X | | | | | | | |
| | 3 | | Management Zone Defined | Defined By | | | | | 10 | | | Example Additional Notes 2 |
| | | | | Aerial Imagery | Yield Maps | Soil Types | | | | | | |
| | | | | 10 | 8 | 6 | | | | | | |
| | | | | X | | | | | | | | |
| 2 | 3 | Production History | Yield Environment | Yield Target (Bu/A) | | | | | 6 | 192 | | Example Additional Notes 3 |
| | | | | > 200 | 180-199 | 160-179 | < 160 | | | | | |
| | | | | 10 | 6 | 4 | 0 | | | | | |
| | | | | | X | | | | | | | |
| | 4 | | Crop Rotation | Previous Crop | | | | | 8 | | | Example Additional Notes 4 |
| | | | | Alfalfa | Soybeans | Corn | | | | | | |
| | | | | 10 | 8 | 6 | | | | | | |
| | | | | | X | | | | | | | |
| | 2 | | Yield Consistency | Percent Acres 20% Below or Above Mean | | | | | 8 | | Example Comment 1 | Example Additional Notes 5 |
| | | | | < 10 | 10-20 | > 20 | | | | | | |
| | | | | 10 | 8 | 6 | | | | | | |
| | | | | | X | | | | | | | |
| | 3 | | End-of Season Basal Stalk Nitrate Test | Test Used? | | | | | 10 | | | Example Additional Notes 6 |
| | | | | Yes | No | | | | | | | |
| | | | | 10 | 0 | | | | | | | |
| | | | | X | | | | | | | | |
| 1 | 1 | Planting | Trait Protected Genetics | Trait Enhanced | | | | | 10 | 10 | Example Comment 2 | Example Additional Notes 7 |
| | | | | Yes | No | | | | | | | |
| | | | | 10 | 0 | | | | | | | |
| | | | | X | | | | | | | | |
| | | | | | | | | | Total | 1332.3 | | |

February 25, 2012,  11:15 am
Alert: Possible crop stress detected
Farm:  Johnson           Field:  Back 80     85 acres

*During an aerial inspection at 10:23 am today, February 25, a deterioration of crop condition was detected.  The change in condition may be due to nitrogen stress.   The change was detected over 27% of the field – excluding 8.6 ac you previously excluded.*

View details
Remind me later
Notify supplier
Send an email

Figure 7 700

| Nitrogen Deficiency Analysis | | | | | | |
|---|---|---|---|---|---|---|
| Field: XYZ     Farm: ABC | | | | | | |
| Date of Report: 5/28/2012 | | | | | | |
| Deficiency | Trend | Farm | Field | Acres | Alerts | Next Observation |
| ⬢ | Down | Johnson | Field 1 | X | 2 | 6/2/2012 |
| ⬢ | Down | Johnson | Field 2 | X | 3 | 6/2/2012 |
| △ | Rising | Johnson | Field 3 | X | 1 | None |
| △ | Steady | Johnson | Field 4 | X | 1 | None |
| ⬢ | Down | Johnson | Field 5 | X | 2 | None |

METHODS, APPARATUS, AND SYSTEMS FOR DETERMINING IN-SEASON CROP STATUS IN AN AGRICULTURAL CROP AND ALERTING USERS

FIELD OF THE INVENTION

The present invention relates to the methods, graphical user interfaces (GUI), computer-readable media, and systems for combining multiple types of data and data sources including in-season crop data related to crop status in agricultural crops, dynamically analyzing the data, making crop status determinations based on that analysis and user defined triggers, and automatically providing alerts to the user, or other designated parties, concerning the status. The present invention detects the status and alerts the user in a timely manner during the crop season such that action can be taken. The system can be executed repeatedly and consistently in a cost-effective, scalable manner and without requiring special agronomic or technical skills.

BACKGROUND

It is well known that the reducing crop stress during the growing season is important to maximize crop quality, yield and economic return. As the crop grows and matures it is subject to a variety of factors that can negatively impact crop outcomes. The term crop stress as used in the present document to describe the crop stress resulting when the factors that cause crop stress during the crop life cycle and can be controlled or managed to some degree but are not managed as effectively as possible. Examples of these factors include nutrient and pH imbalance, insect and other pests, diseases, and other conditions which impact a crop during the growing season. The present document will use nutrient imbalance and in some cases a specific nutrient such as nitrogen as an example of a factor that can cause stress to describe the present invention. It should be noted that the methods and systems described herein apply also to pests and diseases even though the algorithm details may vary. As we describe the invention it should be noted that timeliness and ease of use are of particular importance. By timeliness we are addressing early detection of crop stress, determining the severity of the stress and responding to the stress quickly minimizing their negative impact. For the crop stress issues addressed in the present document corrective action needs to occur as quickly as possible to minimize the negative impact on the crop and it's quality and yield.

Matching the balance of nutrients available for a plant with the nutrient requirements of that plant, at any point in time during the plant life cycle, is critical to reduce stress and to maximize agricultural output and value. Matching available/required nutrient balance is especially important during key times in the plant's life cycle. Nutrient levels below what is required may result in yield loss or a decline in crop quality, and therefore economic loss. Nutrient levels above what is required can result in excessive costs and stressed plants, which is harmful for both plants and humans consuming them, and can negatively impact surface and ground water and has other harmful environmental effects.

While it is important to match the available nutrients to those required by each plant, this balance is difficult to achieve, especially in a scalable manner required in today's large-scale production agriculture operations where a farmer may have thousands of acres located in fields distributed over many miles. If a crop stress resulting from nutrient imbalance is identified shortly after it first begins to impact the plant and action is taken to add nutrients as soon as possible, permanent losses in yield, crop quality, and the resulting negative financial impact can be minimized.

The primary problem, which is addressed by the present invention, is the ability to determine the crop stress as quickly as possible, in-season, and ideally before any, or at least minimal, damage to the crop has occurred, and then make the farmer (grower, farm manager, consultant, supplier, contractor, or other person with the responsibility to monitor crop health, henceforth collectively identified as the user in the present document) aware of the stress such that corrective action can be taken immediately or soon thereafter. In addition, the present invention detects the stress and notifies the user in a scalable and cost effect manner. The process can be executed repeatedly and consistently and without requiring special agronomic or technical skills.

Continuing to use nutrients as an example, laboratory soil testing is currently widely used to determine the level of nutrients in the soil, however, it does not always accurately estimate the nutrients currently available for the crop planted in that soil. These tests are often performed many months before a crop is planted, in some cases years before, and may not reflect the nutrients available for a plant during a particular growing season. Another drawback of soil nutrient tests is that they do not take into account factors such as soil structure or biological activity, nor to they take into account weather and other factors, which affect the rate at which nutrients leave the soil into the surrounding environment. These, and other factors mean that the concentration of nutrients in the soil can rapidly deviate from the results of a soil test.

Plant tissue tests are almost always more accurate than soil tests when determining the condition of the plant and the need for additional nutrients. They are more accurate because they include additional information about the physiology of the crop and the actual status of crop nutrition rather than nutrients in the soil. Traditional tissue tests are destructive tests where a sample is sent to a laboratory for analysis. Non-destructive tissue tests have advantages over traditional destructive tests in that they can be performed in the field, and provide results much faster than laboratory tests, however these tests are subject to many of the same limitations and constraints as traditional laboratory tests.

The problems with laboratory tests (both soil and plant tissue) are that the results are often difficult to interpret. Also, there is a delay between when the samples are taken for analysis, and the delivery of that analysis to the farmer. This means the results may not be received by the farmer until the ideal time to take corrective action has passed. In addition, laboratory tests can be quite expensive, and they are usually performed randomly across a field and therefore can only, by the nature of sample testing, provide a loose estimate of the nutrient status over the entire field and may not reflect the variability found throughout the field and special problems in specific portions of the field.

Another method currently used to determine crop status is manual visual inspection, commonly called "scouting". This is usually accomplished when the farmer or a contracted expert visually inspects the crop, by literally walking through or driving by the field. This technique is ineffective because the farmer can only inspect a small portion of the crop, is random in nature, and requires ambition, skill and interpretation in the person performing the scouting. This approach also becomes less practical as farm operation grows in scale.

Aerial visual inspection, using aircrafts, satellites, or other flying devices, is also used from time to time. This approach allows the farmer to scout a larger portion of the crop from an advantaged aerial position in a short time. This approach also depends on the skill of the farmer (or pilot, if the aircraft is manned) to make visual interpretations of the data gathered. Depending on the method of aerial inspection, this approach can be costly and therefore cannot be reasonably conducted on a regular, such as daily, basis. Satellites, another source of data, can typically capture imagery data infrequently, often every few weeks, and weather (e.g., clouds) can be an obstacle. The data is captured from a very high elevation making the resolution of the data problematic. Manned aircraft, satellite, or unmanned aerial vehicle (UAV) data is most often in a visual form, and actionable interpretation is difficult unless relying on a person skilled in the art. As a result, satellites and manned aircrafts cannot be depended on for timely crop status detection and are better used as a data source for long term planning.

Yet another approach to determine crop status is to use yield data produced by harvesting equipment, which is generated when the crop is harvested. Overlaying yield data, typically in the form of maps, from several years illustrates yield and yield variability over time, and can be useful when making long term plans. However, yield maps are not particularly useful during the growing season when it is important to detect crop status as timely as possible.

Finally new methods and devices, such as an attached device to a nutrient applicator or sprayer or other in-field device, may be used to detect a deficiency as the nutrient is being applied to the field or plant or an operation is performed in the field. When these machines travel back and forth across a field they dynamically make a determination of crop status and then apply the nutrients based on the analysis. These machines are costly, require a pass over the field, and are helpful when applying supplemental nutrients variably, but not as helpful when determining that there is a deficiency and when to take corrective action. Currently, the farmer is left with using one or a combination of all of these techniques, resulting in data for him or her to work with that is generally difficult to interpret, delayed in its usefulness, incomplete, costly, not scalable, and/or not science-based.

Different types and amounts of nutrient applications (such as manure or commercial nutrients) provide an additional set of factors to consider. Nutrient levels available to a plant can vary across the field depending on the chemical makeup of the nutrient, and how it reacts and is absorbed by the plants and soils. Plus, proper application is a frequent problem, caused by operator error, equipment malfunctions, and/or improperly calibrated application equipment.

The present inventor has recognized that current in-season crop status determination methods suffer from the same general problems, namely the lack of a repeatable, consistent, scalable, cost-effective, easy-to-interpret, and timely method to detect crop stress such as nutrient deficiencies in-season for today's production agriculture industry. Methods today are difficult to use and each come with their own set of technical, economic, and timing barriers. They do not take advantage of technologies such as timely, frequent, and cost-effective in-season data-gathering, mining, federation, and analysis to consistently and automatically make science-based determinations of crop status and crop stress such as nutrient status. Nor do current strategies adapt well to changes occurring in agriculture, namely, the economic need to maximize production, the increasingly larger agricultural operations, the increasingly more common use of unskilled workers, and the continual need to accommodate the occurrence of unplanned events such as inclement weather and climate change.

The present invention solves these problems by providing an analysis and alert system that can receive real time in-season crop data from UAVs (but not necessarily limited to that data source) dynamically combine the received data with additional data, process and analyze it to make determinations and notify the user, or other designated parties, of instances where there is a crop status that varies from parameters defined by the user. These parameters of measurement can be based on, for example, benchmarks established by the user him- or herself, benchmarks established by the present analysis and alert system, Internet-based research and other resources, and/or peer farmers and the results they are achieving. These notifications of crop status to the user or other designated parties can be provided on a timely basis such that corrective action can be taken consistently, repeatedly, and economically, and without agronomic or technical skill. These objectives are accomplished by employing technologies not previously exploited to such ends.

SUMMARY

The methods, apparatus, and systems for determining in-season crop status in agricultural crops and notifying designated parties of crop stress such that corrective actions can be taken are herein described. The crop status alerts system is comprised of a user interface, data feeds, data sources, a communication network, a crop status analyzer and alert generator, and a database. Information regarding in-season crop status may be received from a variety of sources, such as a user, a database, a data feed, a social network, an Internet-based data source, a UAV, an in-field sensor, and/or equipment, via a communication network, such as the Internet, a cloud computing network, a local area network (LAN), a wide area network (WAN), or a wireless LAN (WLAN).

The user interface may be configured to receive an alert, analysis, and determination from the crop status analyzer and alert generator via the communication network, provide the crop status analysis and determinations to the user, receive the information regarding the visual information, field data, planned events, and local knowledge from the user, and provide the received information to the crop status analyzer and alert generator. Optionally, the system may further include a database communicatively coupled to the crop status analyzer and alert generator that is configured to store the received crop status information.

The received information may be processed and analyzed to determine the status of a crop in a field and/or in a portion of a field. This status can be determined based on an analysis of the data including a comparison to, for example, previous data concerning the crop including images data such as patterns, color (visual and non-visual), texture, shape and shadows, non-visual data such as carbine dioxide levels, system-defined benchmarks, user-defined benchmarks, peer farmer-defined benchmarks, other crops in similar environments, and/or nutrient/chlorophyll correlative data, to determine if stresses exist, if any. This analysis is intended to identify conditions that may impact crop stress so that the user can take corrective action. The stresses that are detected may encompass an entire agricultural field or a portion of the agricultural field. If the stresses are determined to be within a defined parameter of acceptability, no alert or notification will be issued to the user or other designated party. However, if they fall outside the defined parameter of acceptability, the crop status analyzer and alert generator will issue the appropriate notification.

For the present invention, the user is generally assumed to be a farmer or other person who manages an agricultural crop. The aforementioned designated parties might include agricultural product and service suppliers, agricultural product buyers, landlords who rent land to farmers, or other persons who have a vested interest and/or responsibility in the growth and outcomes of an agricultural crop.

All of the data incorporated into the crop status alert system is derived from the user, the user's equipment, a UAV (or other flying device, collectively identified as UAV in the present document), sensors, and/or commercial and/or public free and fee-based data sources. The graphical user interface (GUI) may be configured to receive data from the user concerning the agricultural crop. This data may relate to the agricultural fields (location, size, shape, ID or name), planned events (dates, types, location, and other specifics of the crop planted), and local knowledge (including, but not limited to, the user's preferences and experiences, and his or her personal visual inspections of the crop). Other data may be received from other sources via a communication network. This data incorporated into the crop status analyzer and alert generator may be from, for example, a UAV in the form of in-season data or from Internet-based data sources, relating to field data (soil types, weather patterns, climate, slope, etc.), unplanned events (current weather data, etc.), and scientific and agronomic data (including, but not limited to, known best practices, research, plant research, extension, and universities). On some occasions, an attribute of the received information may be determined and the received information may be incorporated into a corresponding attribute of the database. For example, when an attribute of the received information relates to the crop or field's condition, it may be incorporated into a corresponding field condition attribute.

A portion of the data that the user enters relates to his or her preferences in how the crop status analyzer and alert generator receives and analyzes the data, the parameters around how and when the system notifies the user or other designated parties, any exclusions that the user desires exempt from the analyzed data, and the manner and method by which the user, and/or other designated parties, are alerted to potential stresses.

The crop status analyzer and alert generator sends alerts to the user, and/or other designated parties, through the communication network and the GUI. In one embodiment, this notification may take the form of a text message, or a phone message. In another embodiment, this notification may include maps to define the location, size, and shape of the area where the stress that falls outside the user's established acceptable parameters has been determined. It may also include a visual analysis in the form of a chart or graph displaying analysis, activities, and comparative data. The user to give the user a more nuanced view of the crop status data may alter data display preferences. In one embodiment, an example of a data display preference is the ability of the user to exclude geographic areas within his or her fields that he or she does not want included within the analysis. This exclusion allows the user to remove from consideration data and/or areas of a field that are physically incongruent with the rest of the field (e.g., ditches, rock piles, former building sites, special situation areas, etc.) and therefore skew or distort the overall dataset and the resulting analysis. Iterations of data gathering/receiving events may occur over a period of time, providing the user with comparative data of the same crop in the same field over time. Likewise, through the use of social networks, peer users may compare their crop health with others, including those other users who have crops in relative proximity and those of other users who may share similar environments (soil types, climate, weather, seed varieties, etc.). For example, a when a farmer has a disease or pest problem there is a high likelihood that other farmers in the social network may also have a similar problem. In this manner crop stress findings and alerts can spread quickly across one or multiple networks of farmers. In another embodiment, the user may be able to personally view the underlying data. Alerts may also be issued to other interested parties, as designated by the user. These alerts are intended to keep the suppliers, buyers, landlords, and others abreast of the in-season crop growth progress.

In an exemplary method, data regarding a status of a crop may be received from, for example, a user, a contact of the user (e.g., an employee of the user, a peer farmer, or a party linked to the user via a social network), an in-season data gathering source, a database, a data feed, an aerial sensor, a unmanned aerial vehicle (UAV), and/or a remote sensor via a communication network.

The received information may include one or more of following attributes of the crop and/or the land on which the crop is grown, nutrient level, a water level, an indication of pest infestation, an indication of pest damage, an indication of unwanted vegetation infestation, an indication of disease infestation, an indication of disease damage, local knowledge of the crop, local knowledge of the land, crop characteristics, weather data, information regarding a planned event, information regarding an unplanned event, soil characteristics, geographic characteristics, geologic characteristics, and climate characteristics.

The received data may be evaluated and then scored. The scores may be automatically compared to, for example, a benchmark, a parameter, a previously determined crop status, and/or a baseline status associated with the crop.

When the score exceeds a predetermined threshold an alert may be generated and provided to a user via the communication network. In one embodiment, the predetermined threshold is user configurable. The alert may indicate a level of crop distress and or a location of crop distress. Exemplary alerts may include one or more of the score, a visual representation of a location of crops with scores that fall outside the predetermined threshold, a visual representation of a trend for crop status over a period of time, a chart showing crop status trends, a visual display of locations excluded from crop status determinations, a visually enhanced display of certain aspects of the information as selected by the user. In some instances, the alert may include information about the crop received at different times.

In some embodiments, the alert may be generated upon an occurrence of an event, such as a weather event, a predicted yield of the crop (e.g., when optimum crop ripeness is detected), detected level of water, crop damage, or stress, and/or a detected presence of a pest, a pollutant.

The alert may be provided to the user in a format compatible with a display device (e.g., computer monitor, screen of mobile communication device, etc.) via which the user views the provided alert. Exemplary users to which alerts may be provided include farmers, managers, landlords, buyers of the crop, and suppliers of supplies, goods, and/or services utilized in the farming or harvesting of the crop. In one embodiment, the alert is provided to a plurality of users. In some instances the alert may be provided to the plurality of users via a social networking service (e.g., Facebook™, Google+™, etc.).

On some occasions, the alert may be tailored or configured according to, for example, a user characteristic, a user preference, a type of alert, and an amount by which the score exceeds the predetermined threshold, and/or a type of score. Often times, following a data event the alert is provided within a time period (e.g., within a few hours or days) that enables the user to take a corrective action to improve the status of the crop. On some occasions, one or more of the received information, the comparison, the score, and the alert in a database may be stored in a database.

On some occasions, stored received information, and/or previously generated comparisons, scores, and/or alerts may be accessed. The additional information may be compared with the accessed received information, the comparison, the score, and/or the alert and a change in crop status may be determined responsively to the comparison. In some embodiments, a trend in the crop status may further be determined responsively to the comparison.

In some embodiments, the benchmark, parameter, previously determined crop status, and/or baseline may be generated using, for example, the received data, comparison, and/or score. On some occasions, the comparison and/or the score may be used to update, for example, the benchmark, the parameter, the previously determined crop status, and/or the baseline.

In one embodiment, instructions regarding how to process (e.g., evaluate, score, and/or compare) the received information may be received from the user and the received information may be processed according to the received instructions.

In one embodiment, a recommendation based upon, for example, the comparison and/or the score may be determined. The recommendation may include, for example, one or more present or future actions the user may take to address the subject matter of the alert, decrease crop stress, and/or or improve crop health.

In an alternate embodiment, information regarding a status of a crop may be received from, for example, a user, an in-season data gathering source, a database, a data feed, an aerial sensor, an unmanned aerial vehicle (UAV), and/or a remote sensor via a communication network. Baseline data for the crop may then be automatically created using the received crop status information.

Additional information regarding a status of a crop may then be received from, for example, the user, the in-season data gathering source, the database, the data feed, the aerial sensor, the UAV, and/or the remote sensor via the communication network. The additional received data may be compared to the created baseline data and the comparison may be scored. When the score exceeds a predetermined threshold, an alert may be generated and provided to a user via the communication network.

BRIEF DESCRIPTION OF THE DRAWINGS

The present application is illustrated by way of example, and not limitation, in the figures of the accompanying drawings, in which:

FIGS. 4A and 4B are flow charts depicting exemplary processes, in accordance with some embodiments of the present invention;

FIGS. 5A-C depict an exemplary table of crop status data, in accordance with some embodiments of the present invention; and FIGS. 6-10 are screen shots of various user interfaces displayed to the user that enable the user to interact with systems and system components described herein, in accordance with some embodiments of the present invention.

Figure 1:
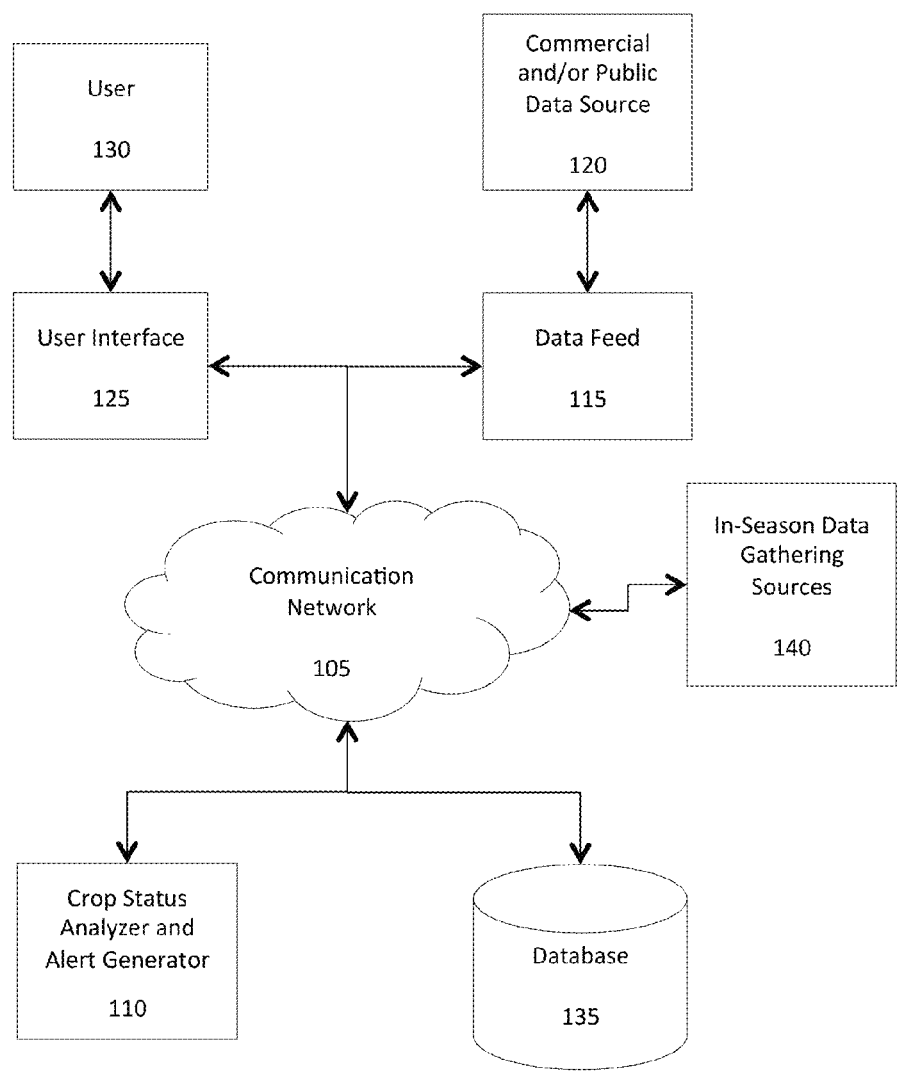
FIG. 1 is a block diagram illustrating an exemplary system for determining crop status and providing an alert to a user, in accordance with some embodiments of the present invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

The present invention concerns methods and systems that combine, analyze, and process various types of data from various sources to determine in-season crop status in plants and generate notifications that may be provided to and/or used by people engaged in production agricultural operations. Crop status determinations and notifications, or alerts, generated in accordance with the present invention may include reasons detailing the cause of said alerts. In some embodiments, a user may be able to manipulate various aspects of the defined parameters of status acceptability in order to ensure that he or she will receive alerts when those alerts are the most effective and useful for that particular user and not become a nuisance, such as the proverbial boy crying wolf. The crop status analyzer and alert system executes a process by which the crop condition and crop status data is received and analyzed, and the resulting determination of a status of crop status is reported to the user based on his or her pre-established parameters of acceptability.

In some cases, the crop status analyzer and alert system may be designed to include the user's local knowledge or requirements. For example, a crop status alert may be issued by the crop status analyzer and alert generator to the user based on inclusions or exclusions of data related to geographical locations or known crop or field conditions or practices that may be known only at the local level. If, in this example, the user desires to exclude a portion of his or her field due to information known only at the local level, such as the presence of a former building site or a manure, chemical or fertilizer spill in the past, that data may, or may not, be incorporated into the analysis performed by the crop status analyzer and alert system. In this way, the excluded data does not adversely affect the accuracy of the received information or calculations done thereon.

The present invention enables a user to identify problems with a crop's health, otherwise known as "crop distress" in the present document as soon as possible such that corrective action can be taken and the distress rectified so that crop deterioration and yield loss is minimized. In the present embodiment, UAVs are the preferred method by which to gather data, however other sources, such as manned aircrafts, satellites, and remote sensors may also be used. The present document will not define controlling the manned or unmanned aircrafts. Likewise, the present document will not define the type of images used. These technologies are well documented and while used by the crop status analyzer and alert generator, they are not the subjects of the present invention. This invention will focus on the aspects related to determining crop status and alerting designated parties of such crop status.

Turning now to FIG. 1, a block diagram depicting an exemplary system 100 for executing one or more of the processes described herein are illustrated. System 100 includes a communication network 105, which communicatively couples a crop status analyzer and alert generator 110, a database 135, a user interface 125 (associated with a user 130), a data feed 115 (associated with commercial and/or public data source 120), and an in-season data gatherer 140. Note, although only one communication network 105 is shown in the illustration, there may in fact be multiple such networks and internetworks involved and such networks and internetworks may be grouped together into communication network 105 for purposes of simplifying the present discussion. Further, in some instances some of the components illustrated in FIG. 1 may be combined or may be absent from instantiations of the present invention. For example, once the crop status alert has been generated, user 130 may view the alert on personal computers, tablet computers, smart phones, or other portable computer-based devices, in which case the crop status alert information may be self-contained and access to the communication network and other elements of system 100 may not be required until the crop status alert or information concerning crop status needs to be modified or updated. Although only one user interface 125 is shown, multiple such interfaces may exist. Thus, system 100 in FIG. 1 is best regarded merely as an example of a system in which the present invention finds application.

As indicated, communication network 105 communicatively couples the other elements of system 100 to one another. Exemplary communication networks 105 include cloud computing networks, the Internet, local area networks (LAN), wireless local area networks (WLAN), and wide area networks (WAN). Usually, though not necessarily, user 130 may connect to system 100 periodically to change his or her crop status monitoring preferences (e.g., include or exclude certain geographic areas for the system's analysis, change the sensitivity parameters that the user has pre-established, or make other modifications). In some cases users 130 may communicate crop status information to other users 130 such as employees, consultants, buyers, suppliers, and landlords. In some embodiments, multiple users 130 may be enabled to communicate with one another via a communication network 105 in a manner similar to, for example, a social network. The information exchanged via these communications may be used to determine, for example, crop status baselines or benchmarks that extend beyond a singular operation. In some embodiments, crop status analyzer and alert generator 110 may reside on a computer-based platform, such as a server or a set of servers. Such a server may be a physical server or a virtual machine executing on another hardware platform, however, the precise nature of such a configuration is not critical to the present invention.

Such a server, indeed all of the computer-based systems which are discussed herein, will be generally characterized by one or more processors and associated processing elements, interfaces, and storage devices communicatively interconnected to one another by one or more busses or other communication mechanism(s) for communicating information. Storage within such devices will usually include a main memory, such as a random access memory (RAM) or other dynamic storage device, for storing information and instructions to be executed by the processor(s) and for storing temporary variables or other intermediate information during the use of the crop status alert system described herein. Such a computer system may also include some form of read only memory (ROM) or other static storage device for storing static information and instructions for the processor(s). A storage device, such as a hard disk or solid state memory may also be included for storing information and instructions, such as the instructions to compute crop status from externally gathered image data, and issue alerts if so required based on the pre-defined acceptability parameters. RAMs, ROMs, hard disks, solid state memories, and the like are all examples of tangible computer readable media, which may be used to store the instructions which comprise the methods for determining the necessity of generating and presenting crop status alerts in accordance with embodiments of the present invention. Execution of such instructions causes the various computer-based elements of system 100 to perform the processes described herein, although in some instances, hardwired circuitry may be used in place of, or in combination with, such computer-readable instructions to implement the invention.

To facilitate user interaction, collection of information, and provision of results, the computer systems described herein will typically include some form of a display device, though such a display may not be included with the server, which typically communicates results to a client/manager station (via an associated client/manager interface) rather than presenting same locally. Client/manager stations will also typically include one or more input devices such as keyboards and/or mice (or similar input devices) for communicating information and command selections to the local station(s) and/or server(s).

To facilitate the network communications alluded to above, the various computer devices associated with system 100 typically include a communication interface that provides a two-way data communication path. For example, such communication interfaces may be Ethernet or other modems that provide a wired data communication connection or a wireless communication interface for communication via one or more wireless communication protocols. In any such implementation, the communication interface will send and receive electrical, electromagnetic, or optical signals that carry digital data streams representing various types of information. This facilitates the exchange of data, including crop status analyzer and alert information, through network(s) 105 as described herein.

Crop status analyzer and alert generator 110 may be configured to generate a crop status alert by receiving input from user 130, data feed 115, commercial and/or public data sources 120, in-season data gathering sources 140, and/or accessing data stored in database 135. Crop status analyzer and alert generator 110 may use historical crop information in order to, for example, determine a stage of development for a crop and/or determine crop status in a typical year.

Data feed 115 may provide remotely gathered data relating to, for example, vegetation characteristics, weather (e.g., thunderstorms, tornadoes, temperature fluctuations), climate (e.g., average temperature and/or rainfall), and geological data and events (e.g., mudslides, floods, earthquakes, etc.). Data feed 115 may be provided by, for example, various public (e.g., the U.S. Department of Agriculture or the National Oceanic and Atmospheric Administration) or private sources and may be so provided on a fee or fee-free basis. Crop status analyzer and alert generator 110 may automatically include consideration of historically known climate conditions (e.g., historic temperature or rainfall, etc.) for a geographic location when generating a crop status alert. On some occasions, a data feed may be associated with a system used or provided by an agricultural product supplier. On some occasions, data feed 115 may be provided by a social networking service (e.g., Twitter, Facebook). In this way, one or more users may communicate information that may be relevant to, for example, crop status, status updates of current stress levels for peer farmers, or crop status treatment methods and strategies of peer farmers between one another. Crop status alerts may be generated in a partially or wholly automated manner by crop status analyzer and alert generator 110 in response to, for example, analysis of peer group data, historical, real-time, and/or known data relating to crop status.

Exemplary commercial and/or public data sources 120 include the Internet (public and private data services), subscription data sources. Combines, planters, sprayers and other equipment used to execute various agricultural practices are another sources of data Other commercial and/or public data sources 120 may be extension, academic and/or research organizations, suppliers of crop inputs, buyers of crops, and peer farmers.

In-season data gathering sources 140 may include UAVs, aircrafts, satellites, in-field physical sensors and/or equipment used to measure field conditions for one or more fields or portions of fields included within the crop status analyzer and alert system monitored area. The measurements are of the target field's crop condition including, but not limited to, color (traditional and infrared), patterns, tone, texture, shape, shadow, temperature, size of the area, intuited nutrient levels, and/or information concerning the larger area in proximity to the targeted field or portion of that field. For the sake of this document, UAVs are the primary data source for in-season crop condition data based on their ability to gather data in a timely, quick, scalable, and economical fashion.

Database 135 may be one or a series of databases linked together and in communication with crop status analyzer and alert generator 110. Database 135 may store data related to any facet of crop status determination including, for example, current and historical data, including imagery produced by a UAV, satellite, or other aerial device. Database 135 may also include field location, soil characteristics, topography, historical weather, crop data, such as crop type, and seed variety. Database 135 may further include crop characteristics and farming practices, such as when and how the field is tilled and planted (for example, planted seed population), historical nutrient measurements, historical yield maps, notes, unplanned events, local knowledge, and planned events. Further details regarding the information stored in database 135 are discussed below with regard to FIG. 2.

Generating a crop status alert can involve the user 130 manually selecting or entering, for example, various observations and preferences (e.g., areas to exclude, visually determined conditions, and/or notification trigger parameters) for the area using the user interface 125. A user may enter local knowledge into crop status analyzer and alert generator 110 for incorporation into the crop status analyzer and alert system. For example, a user may enter a period of time in which a particular field will be analyzed, details concerning manure applications, or observations made when planting or harvesting that may be incorporated into the crop status analyzer and alert generator 110. On some occasions, manually selected preferences and other user-entered information may be stored in database 135.

The crop status analyzer and alert generator 110 provides information about determined potential nutrient deficiencies to user 130. This may be done in a variety of ways, including through the use of an e-mail and/or a message relayed via a messaging system accessible through communication network 105 that includes hyperlinks to a portal at which details regarding the crop status are available. Other forms of communication, such as an instant message or a text message sent via short message service (SMS) to a user's mobile phone may also be used to indicate a crop status alert trigger has occurred. In FIG. 1, user interface 125 is meant to represent any device via which user 130 can be provided with information regarding the crop status. Exemplary interfaces 125 include computer systems, mobile computing devices (including but not limited to so-called "smart phones"), tablet computing devices, and portable computing devices.

In some embodiments, one or more users 130 may be enabled to access a crop status analysis via user interface 125 communicatively coupled to network 105. Interfaces for various types of users may be different in form and content, or similar to user interface 125. Exemplary users 125 include employees, managers, owners, equipment operators, suppliers, consultants, regulators, and others who assist user 130 in the determining, and/or executing a corrective strategy.

Figure 2:
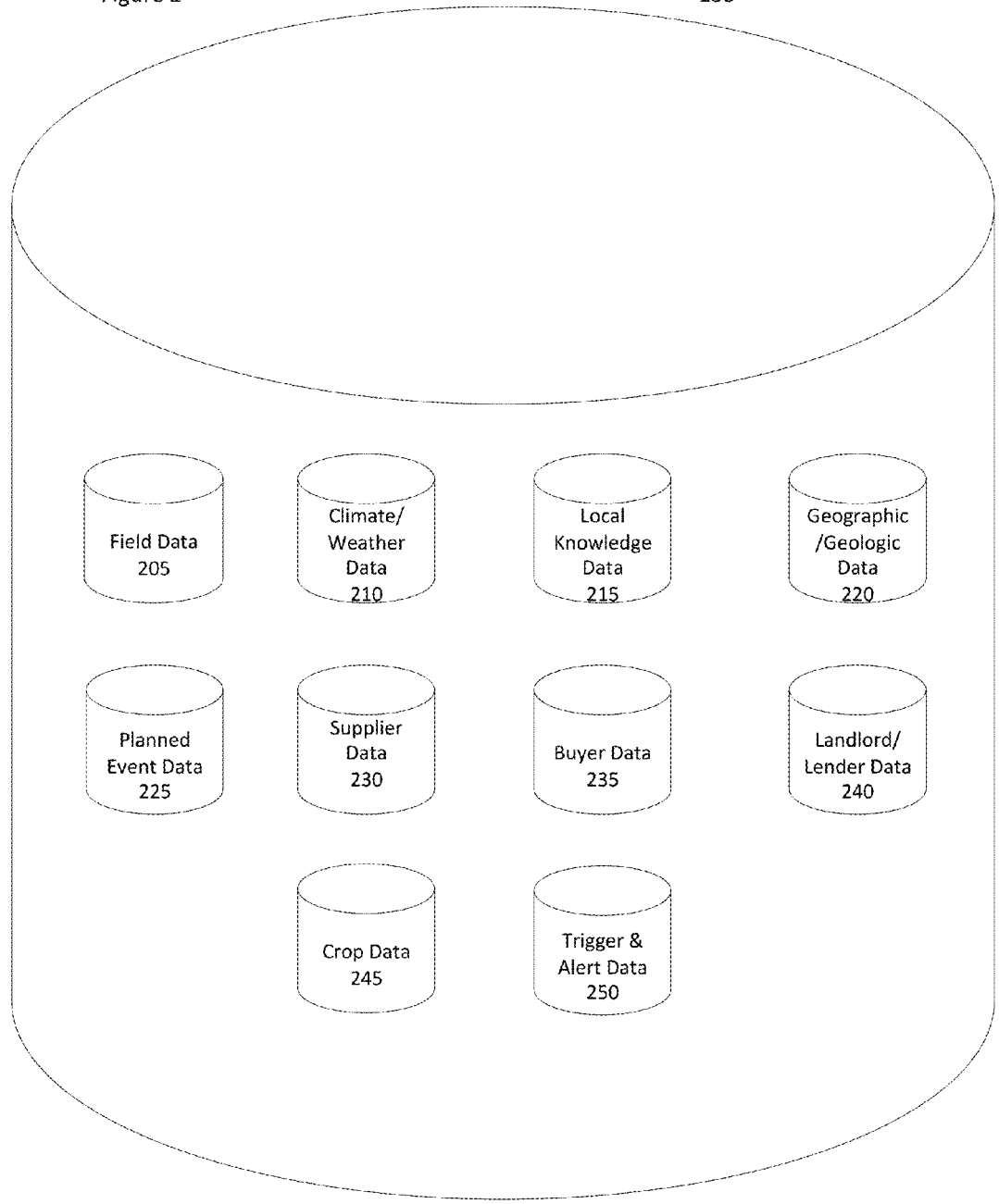
FIG. 2 is a block diagram illustrating an exemplary database, in accordance with some embodiments of the present invention.

FIG. 2 is a block diagram depicting exemplary sets of data or databases that may be included in database 135. For example, database 135 may include field data 205, climate and weather data 210, local knowledge data 215, geologic/geographic data 220, planned and executed event data 225, supplier data 230, buyer data 235, landlord data 240, crop data 245, and trigger and alert data 250. Information stored in database 135 may be received from, for example, a user, such as user 130, a data feed, such as data feed 115, an in-season data gathering source, such as in-season data gathering source 140, via a communication network, such as communication network 105, and/or a combination of the foregoing.

Field data 205 may include information regarding, for example, field locations, the shape of the field, the proximity of the field to other relevant locations such as other fields managed and farmed by the user. In this embodiment, field data may include field data for other farmers' fields. It may also include the field's characteristics, such as topographical information, soil types, organic matter, moisture condition and capacity, fertility, and other non-crop vegetation on the field. In addition, field data 205 may include historical crop production data on the field, including former crops planted and historical yields, including yield maps illustrating yield variability across the field, as-planted maps, and tile maps. In addition field data 205 may include historical fertility test results and practices specific to that field including for example, tillage and irrigation. On some occasions, field data 205 may include areas of land proximate to the crop to be excluded from analysis.

Climate and weather data 210 may include information relating to historical and predicted weather and/or climate conditions for a particular region, area, or field.

Local knowledge data 215 may include information relating to knowledge or preferences specific to a user and may include, for example, preferred agronomic and other crop production practices, site-specific knowledge, past experiences, activities, observations, and outcomes. On some occasions, local knowledge data 215 may be used to override or modify an aspect of a crop status analysis. On some occasions, local knowledge data 215 may include data received via a social network from other users.

Geographic/geologic data 220 may include geographic and/or geologic data related to, for example, fields, which are included in the determination, analysis, and alerts. Exemplary geographic or geologic data may include roadway, surface and/or underground water, and landmark locations. Geographic/geologic data 220 may be derived from a variety of sources, such as satellite images, global positioning information, historical information regarding an area of land, plat book service providers, non-governmental organizations, and public and private organizations and agencies.

Planned event data 225 may include information regarding planned events proceeding, during, and/or following completion of the crop-growing season. Exemplary planned events may relate to activities such as when crops are planted and the seed specifications and planting information, such as planted seed locations and population, scouting events (e.g., on site crop inspections), out-sourced fertility tests, follow-up assessments, scheduled aerial data gathering events, and treatment events.

Supplier data 230 may include supplier information (e.g., names, locations, services, products, prices, contractual information, etc.), as well as delivery and/or instructions, dates and other special activities related to crop status analysis and alerts.

Buyer data 235 may include data that relates to obligations and specifications that a buyer of an agricultural crop may have imposed on the farmer that impact the crop status analysis and crop status, such as, for example, restrictions, response requirements, standards, notifications, schedules, requirements, and the like.

Landlord/lender data 240 may include data that relates to obligations and specifications that a landlord and/or lender may have imposed on the farmer that impact the crop status, such as, for example, restrictions, response requirements, standards, notifications, schedules, requirements, and the like.

Crop data 245 may include crop conditions over the growing season as determined through various sensing methods, such as through UAVs or visual observations, and through the user's local knowledge. It may include previously performed analyses and determinations of crop status.

Trigger and alert data 250 may include specific measurement parameters that, if exceeded, cause an alert to be triggered and sent to the user. In the present embodiment the triggers are preset to defaults by the crop status analyzer and alert system. However, the user can override the default triggers on a field and/or operational level if he or she feels the desire to do so. Additional data in this database may include historical determinations, and alerts that have been sent to the user.

Figure 3:
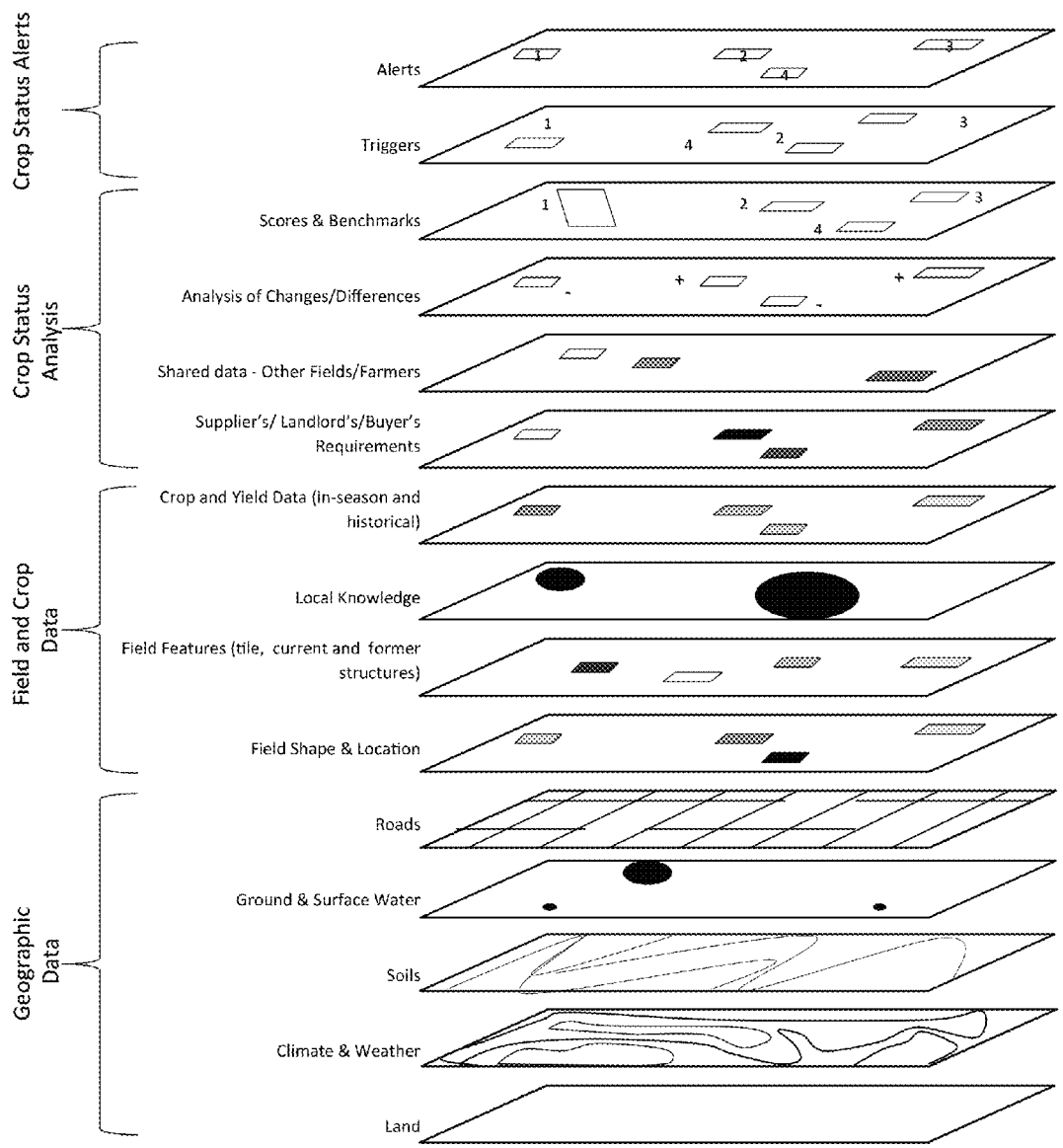
FIG. 3 is a diagram illustrating an exemplary geographic information system (GIS) data, in accordance with some embodiments of the present invention.

On some occasions, the geographic and/or geologic data 220 may be part of a geographic information system (GIS), an example of which is illustrated in FIG. 3. As shown, GIS layers image 300 includes various data structures, each of which may be regarded as a layer. These layers provide information regarding various data elements of a crop status analysis and alert for a field, including, for example, geographic data, field data, crop status analysis data, and crop status alert data.

Exemplary geographic data may include, for example, information related to an area of land (the field plus adjacent areas) (e.g., latitude, longitude, etc.), historical weather and climate information, soil attributes (e.g., soil types, texture, organic matter, fertility test results, etc.), the presence and location of ground and surface water, and any man-made features upon the land (e.g., buildings, roads, ditches, etc.) currently existing or formerly in existence. Exemplary field and crop data may include the location, size, and shape of the field, and/or may be related to tiling information. Exemplary local knowledge may include special insights concerning the field that only the farmer farming the field would know. It may also include comments and data related to special events and visual observations. Historical crop and outcome data may include former crops planted and yields, fertility tests, and fertilizer applications. Exemplary crop status analysis data may include requirements imposed on the farmer by the landlord, lender, or buyer of the crop and/or instructions and contracts with the supplier of crop inputs and services. Crop status analysis data may also include data shared from other farmers, and established parameters, baselines, benchmarks, and scores. Crop status alerts data may be those issued alerts that are stored in database 135.

FIG. 4A is a flow chart depicting an exemplary process 400 for determining a crop's nutrient status and providing and message or alert to a user responsively to the crop's determined nutrient status in accordance with an embodiment of the present invention. Process 400 may be executed by, for example, the crop status analyzer and alert generator 110 described in connection with FIG. 1 in cooperation with, for example, any of the systems and/or system components disclosed herein.

In step 405, data regarding a crop status may be received by, for example, crop status analyzer and alert generator 110. The data may be data produced by, for example, a UAV, an in-field sensor, commercial and/or public data sources, or data entered by a user based on a visual inspection. The data may be received from any number of sources, including a user, like user 130 (via a user interface, such as user interface 125), commercial and/or public data source 120, a database, such as database 135, a data feed, such as data feed 115, and an in-season data gathering source, such as in-season data gathering source 140. The data may be received via a communication network, such as communication network 105.

Exemplary received data may relate to any or all factors affecting a crop's nutrient status, such as, but not limited to, the crop's overall health, crop maturity, characteristics of land on which the crop is grown (e.g., geographic location, size, soil characteristics, weather and climate data, etc.), planned events (e.g., fertilization, harvesting, or irrigation schedules), unplanned events (e.g., severe weather events), local knowledge of the crop and/or the land on which the crop is grown (e.g., previous success rates with crop growth strategies), historical patterns, scientific research, levels of pest, disease, and/or unwanted vegetation infestation, amounts of particular nutrients found in the crop and/or land on which the crop is grown, water levels found in the crop and/or land on which the crop is grown, and crop characteristics (e.g., maturity rates, genetics, growth characteristics, or disease resistance).

Next, the received data may be processed in order to, for example, reformat the data, remove duplicate data, organize the data, and/or consolidate data (step 410). In some instances, the processing may include dividing an image or information relating to a field upon which the crop is grown into sub-divisions or sections using, for example, a Cartesian grid pattern, a concentric circle pattern, or a wedge-shaped pattern. The size of the sections may be a default value or determined by the user for example the user may want the size of the section to match the size of the equipment to be used. The size of sections may vary from acres to square feet, depending on, for example, the size of the field, the precision of the data source, the precision of the data analysis equipment, and/or user preferences. For example, when the crop is growing on a field with relatively large crop status variability, the sections may be relatively small in order to more precisely analyze the field. In another example, when a general overview of crop status is desired, the sections may be relatively larger in order to, for example, capture a general sense of crop status and minimize processing resources spent on unnecessary details.

It is understood that across a particular field, crop status may vary due to a number of factors such as nutrient application inconsistencies, variable manure nutrient value, soil variability, and the unevenness of rainfall, to name a few of these factors. Dividing a field into sections enables analysis of each portion of the field independently of other portions of the field. In some scenarios only one section may indicate crop distress while all other sections indicate no crop distress (i.e., normal crop condition). Localized crop distress may be an indicator of widespread crop distress to follow or the correction of conditions so as to alleviate crop distress.

In step 415, it may be determined whether parameters, crop status determinations, and/or benchmarks are available. On some occasions, parameters, crop status determinations, or benchmarks may be indicative of threshold values relating to a crop's status. Further discussion of exemplary parameters, crop status determinations, and/or benchmarks is provided below with regard to FIGS. 5A-C.

When parameters, crop status determinations, and/or benchmarks, are not available, one or more parameters, crop status determinations, and/or benchmarks may be generated (step 420) using, for example, the data received in step 405 and/or data retrieved from, for example, a user, like user 130 (via a user interface, such as user interface 125), commercial and/or public data source 120, a database, such as database 135, a data feed, such as data feed 115, and an in-season data gathering source, such as in-season data gathering source 140.

The data received in step 405 may then be compared with the parameters, crop status determinations, and/or benchmarks (step 425) and the comparison may be scored (step 430). Exemplary scores may indicate overall field nutrient status, nutrient status for a portion of a field, and/or changes in nutrient status for a field, or portion of a field, based previous crop status determinations.

In some embodiments, the score of step 430, indicated below as the new data score, may be generated according to equation 1 provided below:

$$S^{new} = (w(g^i) + w(g^s) + w(g^w) + w(g^{lk}) + w(g^{om}))\quad\text{[Equation 1]}$$

wherein:
New Data Score=$S^{new}$
Weighting=w
Field Section=g
Field Section Image=$g^i$
Field Section Soils=$g^s$
Field Section Weather=$g^w$
Field Section Local Knowledge=$g^{lk}$
Field Section Organic Matter=$g^{om}$
Parameters=$X \leftarrow\rightarrow Y$ The comparison score ($S^{compared}$) may then be generated according to equation 2 provided below:

$$\text{Compare } S^{new} \text{ against} \rightarrow S^{benchmark} = S^{compared}\quad\text{[Equation 2]}$$

wherein $S^{benchmark}$ represents the parameters, crop status determinations, and/or benchmarks of step 425.

Further details regarding the comparison and scoring of steps 425 and 430 are provided below with regard to FIGS. 5A-C.

It may then be determined whether the score exceeds a threshold amount (step 435). When a score does not exceed a threshold amount, process 400 may end. When a score does exceed a threshold amount, an alert indicating the outlier score and/or one or more reasons for the outlier score (e.g., level of crop stress, type of crop stress, trend in crop status, etc.) may be created (step 440) and provided to a user via, for example, a communication method selected by the user (e.g., email, phone call, SMS text message) (step 445).

In some embodiments, equations 3 and 4, provided below, may be used to execute steps 435 and 440 of process 400.

$$\text{If } S\text{compared is } >X \text{ parameter and/or } <Y \text{ parameter,}$$
$$\text{then create alert}\quad\text{[Equation 3]}$$

$$\text{If } S\text{compared} >X \leftarrow\rightarrow Y< S\text{compared, then create alert}\quad\text{[Equation 4]}$$

Exemplary content of the alert message includes a reason for the alert, the date and condition of the last crop status data sample, the location(s) of the determined change in crop status, an area of land excluded from analysis, and an area of land determined to have activated the trigger of an alert. Of course, the actual content of an alert message will depend on the embodiment and can differ for many reasons including, for example, the preference of the user, type of crop, the type of device the alert is sent to, or severity of the crop status. Another example of message content is a simple notification to "check a field" or maintain surveillance of a field on a "watch list" with little specificity as to the determination or severity of the crop status. In some embodiments the content of the notification may differ based on the role of the individual user receiving the alert. For example, a supplier may receive a message with information that differs from a message received by a peer farmer included on the distribution list.

In some embodiments, the alert may be sent to multiple recipients included in a distribution list defined by the user via a communication method or combination of communication methods selected by the user and/or an individual recipient. The distribution list may include individuals or organizations that should know about the crop status determination or those who may be helpful and could take action to quickly remedy the crop status. Examples of people who a user may want to include in a distribution list are him- or herself, a farm manager, consultant, supplier, buyer, landlord, peer farmer, and/or banker. In some embodiments the user may want to notify other peer farmers using these methods, however, the user may also use a type of social network to provide notifications. Finally, the received data, the comparison done thereon, the scores, and/or the created alerts may be stored within, for example, database 135 (step 450).

On some occasions, instructions or parameters for determining a crop's status may be user configurable and these rules may be received by, for example, the crop status analyzer and alert generator prior to the execution of process 400. For example, instructions regarding the selection of a field or portions of a field on which the crop is grown from which data will be gathered may be received. Exemplary data regarding the areas to be analyzed may include latitude and longitude, shapes, soils, slopes, topography, historical data, weather, crop, practices, and GIS data. The crop status analyzer and alert generator may then use this data and combine it with other data available for that area. Instructions regarding what type of data to gather and the granularity of the detail for the data may also be received from the crop status analyzer and alert generator. Exemplary parameters may include scores that indicate an unexpected change in normal and customary plant growth, an indication that the crop is deteriorating by a pre-defined measure, or a defined quantity of a field that demonstrates an indication of crop status.

Figure 4B:
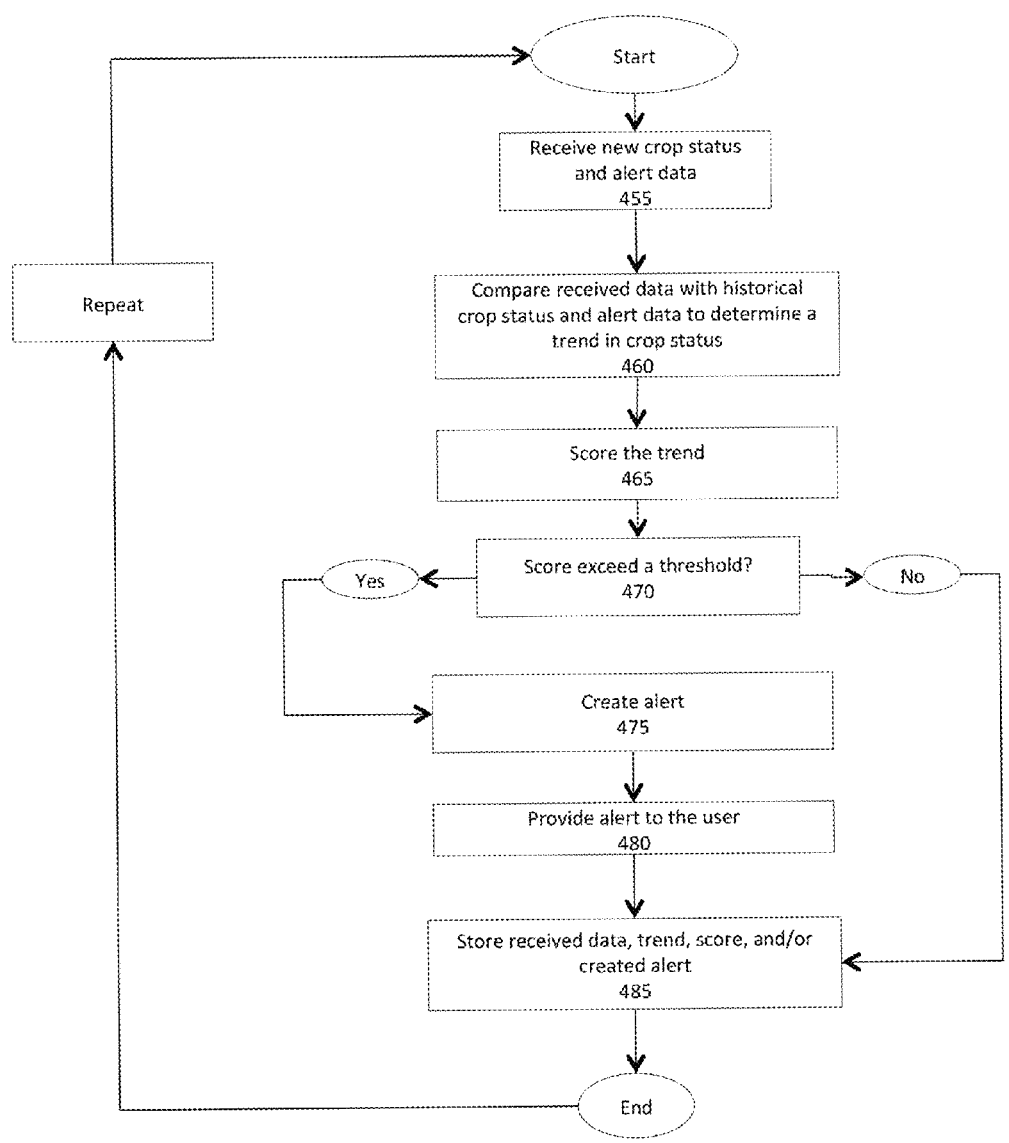

FIG. 4B illustrates a process 401 for determining a trend in crop status and providing and alert to a user responsively to the trend. Process 401 may be executed by any of the systems and/or system components described herein.

In step 455, new data regarding the status of a crop may be received by, for example, a crop status analyzer and alert generator, such as crop status analyzer and alert generator 110. Step 455 may be similar to step 405 as discussed above with regard to FIG. 4A. The received data may then be compared with historical data regarding the crop (step 460) and the comparison may be scored in manner similar to, for example, step 430 as discussed above with regard to FIG. 4A (step 465).

When the score does not exceed a threshold, the results of the comparison and/or the score may be provided to the user and process 400 may end. When the score does exceed a threshold, and alert may be created (step 475) and provided to the user (step 480). Optionally, the alert created in step 475 may include the results of the comparison, the trend, and/or the score of steps 460 and 465, respectively. Finally, the received data, the comparison done thereon, the trend, the scores, and/or the created alerts may be stored within, for example, database 135 (step 485).

FIGS. 5A-C depict a table 500 of data regarding the status of a crop grown on a particular field or section of a field. It should be appreciated that the data depicted in table 500 is merely exemplary and any single, combination, or sub-combination of crop status factors may be considered when determining a crop's status or a trend in a crop's status.

The crop status data of table 500 is divided into numerous categories or factors 520. Exemplary factors 520 include crop stress, fertility added, soils, drainage, improvements, weather's impact on availability, management practices, production history, and planting. Each factor 520 may have one or more sub-factors or categories 525 that may indicate measurements of the crop's nutrient status to any degree of granularity. For example, categories included under the crop stress factor include near infrared (NIR) imagery, normalized difference vegetative (NDVI) index, chlorophyll indices, color imagery, and visual inspection. Categories associated with the fertility added factor 520 include frequency of nitrogen application, timing of nitrogen application, starter fertilizer, manure, residue, and nitrogen as applied. Categories associated with the soils factor 520 include texture, soil variability, tillage, organic matter, pH, and soil tilth (good soil physical condition with good aeration). Categories associated with the drainage factor 520 include potholes, slope, and hills. Categories associated with the improvements factor 520 include tile and irrigation. Categories associated with the weather's impact on availability factor 520 include leeching of nitrogen, nitrogen followed totalization, and nitrogen protection. Categories associated with the management practices factor 520 include sampling type and management self-defined. Categories associated with the production history factor 520 include yield environment, crop rotation, yield consistency, and -of-season basal stalk nitrate test. Categories associated with the planting factor 520 include trait protected genetics.

Data regarding each of these may be received by, for example, a crop data analysis and alert generator, such as crop status analyzer and alert generator 110. The received data may be processed with any degree of granularity and a score 535 may be assigned using, for example, a score matrix 530 that visually indicates the score of the crop, or crop status, with regard to a particular category. For example, the stress status of the crop as measured with NIR imagery has been assigned a score of "6" as indicated on table 500 by the checkmark present within the minor stress status box. The score for a crop in a given category may also be indicated in the total score per category column 535 and the aggregated score for the entire factor may be indicated in the total aggregated score column 540. The aggregated score may be calculated using one or more equations that incorporate the score and one or more weights assigned to the factor (as shown in a factor weighting column 510) and/or the category (as shown in a category weighting column 515 and a). For example, the factor weighting assigned to the management practices factor is 2.1 and the category weightings for the sampling type and management zone defined categories are both "3." The individual scores for the sampling type and management zone defined categories are 8 and 10, respectively. These scores, when multiplied by the factor and category weighting values and then added together guilt and aggregate score of 113 for the management practices factor. Once calculated, the aggregated scores may be added together to generate a total score 555.

Information included with in the comments column 545 and additional notes column 550 may include one information regarding, for example, a factor, category, crop characteristic, measurement data, equipment data, end and explanation for further details regarding a factor, a category, a score, and/or a weight. In other embodiment the notes may be reflected as business rules integrated directly into the software.

FIGS. 6-10 illustrate various aspects of graphical user interface (GUI) screens that may be used to gather and/or present information regarding crop status and alert users of a crop status or a change in crop status in accordance with embodiments of the present invention. The GUIs shown in FIGS. 6-10 may be prepared by, for example, crop status analyzer and alert generator 110 and provided to a user, such as user 130 via an interface, such as user interface 125.

FIGS. 6 and 7 illustrate two examples of alerts provided to the user. FIG. 6 shows an example of an alert message 600 that may be provided to the user in response to a determined status of a crop. This exemplary alert message includes a notification that a crops condition has deteriorated and that this deterioration may be to nitrogen stress. The alert message further includes the location of the crop stress and advises that he or she may want to personally investigate/inspect the location of the determined deterioration to make a final determination. The user may be the farmer or another person designated by the user to receive the information, such as a crop consultant, buyer, supplier, landlord, or other designated person or organization.

In this example, new additional data was generated and received by the crop status analyzer and alert generator during a data-gathering event that occurred at 10:23 am on Feb. 25, 2012. It is important to point out that the information collected during the data gathering event was quickly analyzed and the alert was generated within a timeframe that allows the user to take timely corrective action and thereby minimize damage to the crop that would have otherwise been caused by the conventional lag time between data gathering and data analysis and data analysis and alerting the user to and in potential crop stress. In this example, the data-gathering event was completed by a UAV that captured the data an hour before the alert was sent to the user. This additional new in-season data, combined with data already contained within database 135, was then processed by the crop status analyzer and alert system to determine a crop status score. In this example, the crop status score for 27% of the included acres triggered the crop status analyzer and alert generator to automatically generate an alert and send it to the appropriate user and/or those authorized by the user to receive the alert via communication network 105. The alerts may contain various levels of detail, such as the size and/or location of the area/grids where the analysis was performed. The alert may also contain content that is unique to a recipient, based on the preferences or roles of the recipient or preferences of the user.

FIG. 7 illustrates an exemplary GUI 700 that conveys information relating to the nutrient status of multiple fields to a user. GUI 700 also illustrates changes in those statuses over time, and demonstrates the use of an Internet website as a user interface for an alert system, such as user interface 125. The number of fields and/or field sections depicted in GUI 700 is user configurable. For example, GUI 700 conveys information relating to several (5) fields rather than just one so that the user can receive one alert for all the fields for which crop stress has been determined rather than several alerts focusing on just one field each. In addition, GUI 700 contains an indicator of crop stress severity. A red stop sign icon is used to indicate a severe crop stress, while the yellow yield icon indicates a less severe crop stress. GUI 700 also contains an indication of the crop status trend. These indicators may help the user determine the next steps he or she wishes to take and the level of urgency with which he or she decides to take them. Finally, GUI 700 contains information relating to forthcoming or planned data-gathering events for the field.

Figure 8:
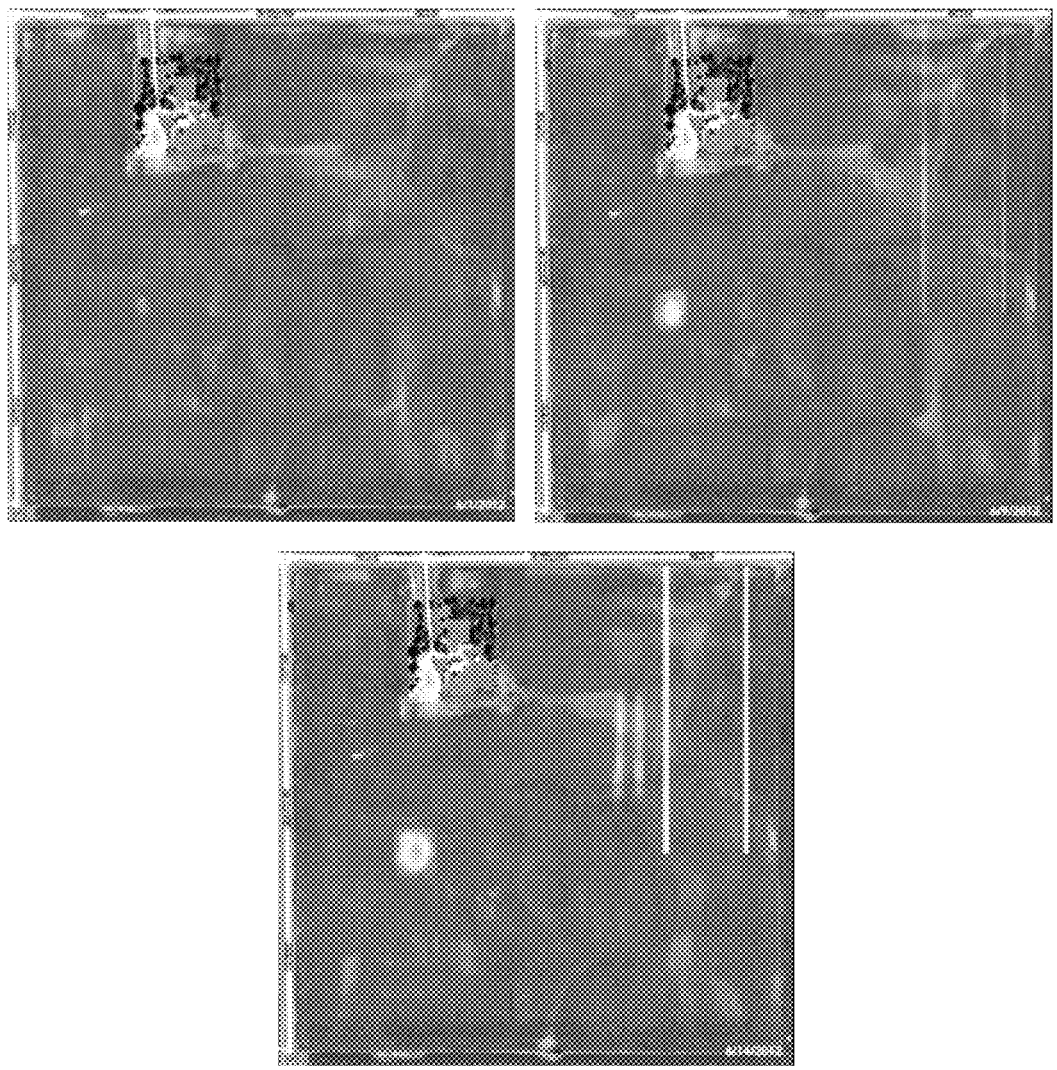

FIG. 8 contains three images of a field captured by a UAV over a period of days and illustrates changes in the crop's condition over time. These images are indicative of the type of image and related data that the crop status analyzer and alert generator will receive and analyze to determine a field's nutrient status and changes in that status over time. As previously described, the changes in a field's nutrient status are measured, for example, based on texture, color (traditional and infrared), patterns, tone, shadows, and temperature and are the basis of generating a score of crop status by the crop status analyzer and alert generator. The present invention may employ computerized image comparisons to analyze images of a field and/or section of a field to discover nuanced changes to the imaged area's status, determine crop status, and issue immediate, or nearly immediate, status alerts.

In some embodiments, certain visual and other display techniques may be incorporated into the display of an alert message such as GUI 700 in order to make the changes in crop status that occur over time more obvious. One such technique is amplification of visual indicators of the change by electronic means via, for example, color or contrast adjustments that make the image easier to understand and illustrate the change in a more dramatic manner. Another technique includes incorporation of time-lapse images that are sequenced on the screen one after another (like in a video) in a manner similar to display of a sequence of time lapse weather radar images as commonly used today with weather radar images. When the user views the time-lapsed images certain patterns within the data may become apparent. Exemplary patterns include trending increases or decreases in the crop health of a field and a geographic direction in which crop health may be increasing or decreasing.

Figure 9:
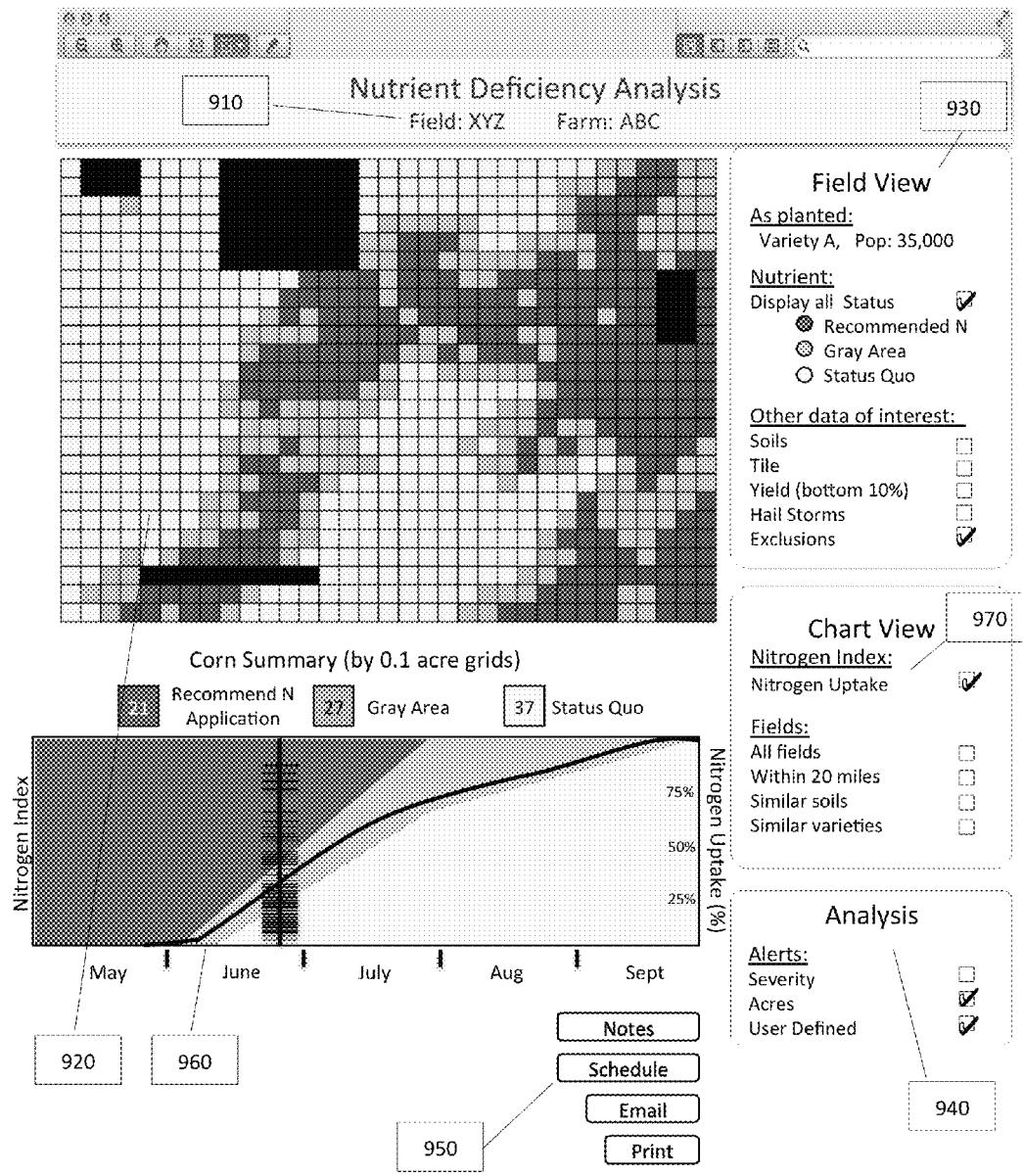

FIG. 9 illustrates an example of a user interface 900 that may assist a user when reviewing information related to crop status. In this embodiment, an alert has been triggered and the user has been notified of a potential problem on this field. However, it is understood that the user can access this information regardless of whether or not an alert has been triggered. It is also understood that the content displayed on user interface 900 may vary depending on the role or preferences of the user. In some embodiments, the presentation of the content on user interface 900 may vary depending on the manner in which it is viewed (e.g., via smart phone, laptop computer, tablet computer, etc.).

User interface 900 provides a user with information regarding crop status of a specific field, or portion thereof, along with additional information that may be helpful to the user. The layout of user interface 900 includes field identifiers 910 as well as an image of the field 920 being observed. Along with the field image 920, there is a modifiable field view window 930 that contains controls that allow the user to alter the types of views of the field 920 displayed on user interface 900. An analysis window 940 is also provided that displays the nutrient alert status, the areas of the field that are to be excluded from the analysis, and the triggers, or sensitivity parameters, which, if activated, result in an alert. The ability to take actions regarding the issued alert 950 is also provided. Exemplary actions include printing user interface 900, emailing user interface 900, scheduling an event associated with user interface 900, and attaching a note or other date to user interface 900. User interface 900 also includes a graphical chart 960 that can show trends in, for example, nutrient status over time, comparisons of nutrient status to benchmarks, and comparisons to other fields. Finally, chart view 970 enables the user to change the content or format of chart 960.

Field identifiers 910 may include, for example, the field and farm names and locations, acreage, global positioning coordinates, latitude and longitude coordinates, crop type, and/or ownership status.

In the example provided by user interface 900, field image 920 is the result of a UAV and an in-season data gathering event. The sections into which the field is divided for the purpose of data gathering and analysis is displayed in this embodiment. The various sizes and number of sections may be user configurable according to one or more user defined criteria, or determined based on, for example, one or more criteria (e.g., level of precision required, specificity of information desired, equipment size), limitations of the imaging device, and/or the elevation at which the image was taken. While not shown on this sample screen, it is understood that various types of information may be available to the user by moving a cursor over the image. For example, displaying consecutively multiple images taken over time enables the user to view changes in crop status over time. In some embodiments, the user may be able to zoom in on part of a field and thereby gain a closer, or more detailed, view of the area. In other embodiments, the views available may depend on the capabilities of the user interface device, on the capabilities of the UAV capturing the data, and/or on the transmission capabilities of the communication network 105.

Modify field view window 930 enables the user to control the content displayed on the field image 920. In this exemplary embodiment, the user can overlay information relating to the crop and variety planted onto the field image 920. This additional crop and variety information may change the way the user views and interprets the data. This embodiment also contains various ways to view the results of the analysis of the data on the field image 920. For example, the user can request to visually identify the portions of the field that have been determined to be below defined benchmarks. For example, a user may elect, via modify field view window 930, to highlight or display only portions of the field identified as in the bottom 10% (most severe crop stress) as determined by the crop status analyzer and alert generator. Likewise, a user may elect, via modify field view window 930, to view or highlight only the portions of the field that have been improving and/or degrading over time. Each of these views will aid the user in making determinations of what follow-up actions, if any, he or she may want to take in order to ameliorate the effects of any detected crop stress. Within field view area 930 the user is enabled to identify portions of the field that he or she wishes to exclude from the analysis (e.g., locations of buildings or bodies of water). This capability enables a user to use his or her own local knowledge of the field and exclude those portions of the data that might naturally deviate from the data received for the intended area to be analyzed and throw off or distort the data set. For example, the user may want to exclude former building sites from the analysis because they may skew the results. The crop status analyzer and alert generator uses this method to prevent needless and unnecessary alerts from being sent to the user.

Analysis window 940 contains a summary of the nutrient status/alert analysis, and identifies the triggers (e.g., deviation from a benchmark or predefined threshold, a percentage change, or an amount of acreage impacted by a crop status), which will cause an alert to be sent to the user. In this example, the field crop status has been determined as having exceeded two of the parameters that trigger an alert. In the alerts portion of analysis window 940 the user is able to identify the parameters, which if exceeded, will trigger an alert to be sent to the user via the communication network. In this example, the user has identified three parameters that he or she would like to be considered when determining if an alert should be triggered. The first compares the field to a predefined severity benchmark and when the severity exceeds the predefined trigger the alert is activated. The second relates to the scope or number of acres and when the trigger exceeds this parameter an alert is activated. Scope within a field is commonly measured as a percent of the field such as 4% of the field or specific number of acres such as 30 acres. The third example illustrates a trigger where the user has defined the field as a "watch field" where he or she wants to receive updates whenever new data is received, regardless of the triggers. This approach may be used for problematic fields where a user wants to pay special attention to the crop status. Of course, there may be multiple ways for the crop status analyzer and alert generator to handle these user-defined triggers. Triggers may relate to contractual obligations a buyer imposed or performance requirements from a landlord. Examples of different approaches include sending an alert to the user every day, or each week, or every time additional data is acquired. The user is also able to add or delete triggers via interaction with analysis window 940.

Capabilities to take actions based on the analysis are, in this example, indicated by the buttons 950 in the lower right portion. For example, it is possible to send an email to a supplier such that the supplier can supply tools, goods, and/or services that may be used to correct the nutrient deficiency. Or the user may make a note, or schedule an event, or simply print a report. Of course, there are other actions that some embodiments may include that which would not detract from the intent of the present invention. In addition, specific information relating to the crop status determination and potential follow-up actions may be included; for example, the coordinates of the portions of the field with a problem may be included in an email, as well as other information.

Graphical chart 960 allows the user to view additional types of data and analysis results concerning status for this specific field or a portion thereof. In this embodiment, the data displayed on graphical chart 960 is entirely user configurable. The depicted exemplary graphical chart 960 includes an analysis of the nutrient scores and graphical depictions of them in three base levels of severity. First, where N application is recommended; second a gray area where the next steps are less obvious; and third status quo level where the nutrient level is satisfactory. In this example, the bottom of the chart consists of a timeline upon which various data gathering events have occurred. In this example, a UAV has gathered data in June. In some embodiments a comparison between the data for this field and other fields and/or known benchmarks may be executed. The user may manually determine the benchmark by which he or she wants the actual data compared, or the benchmark could be determined based on historical data from this field, or possibly based on available online research by a university or other research organization concerning plant health at specific times in its development cycle.

Finally chart view 970 enables the user to control the view of the data in the graphical chart 960 by enabling the user to select and control what specific data is to be displayed on graphical chart 960. For example, the user may set up graphical chart 960 to display comparisons with other fields he or she also farms and/or with those fields farmed by peer farmers. The comparison of this field to one farmed by a peer farmer may be contingent on that peer farmer also using the present invention. This sharing of data, as mentioned before, could be communicated via, for example, a social network, or another Internet-based communication method. The user may want to compare this present field to another in proximity to this field because these fields are most likely to be subject to the same weather and growing conditions. In some embodiments, the user may be limited to comparisons to fields that have specific characteristics, such as planting date, varieties, soil types, farming practices and the like.

Figure 10:
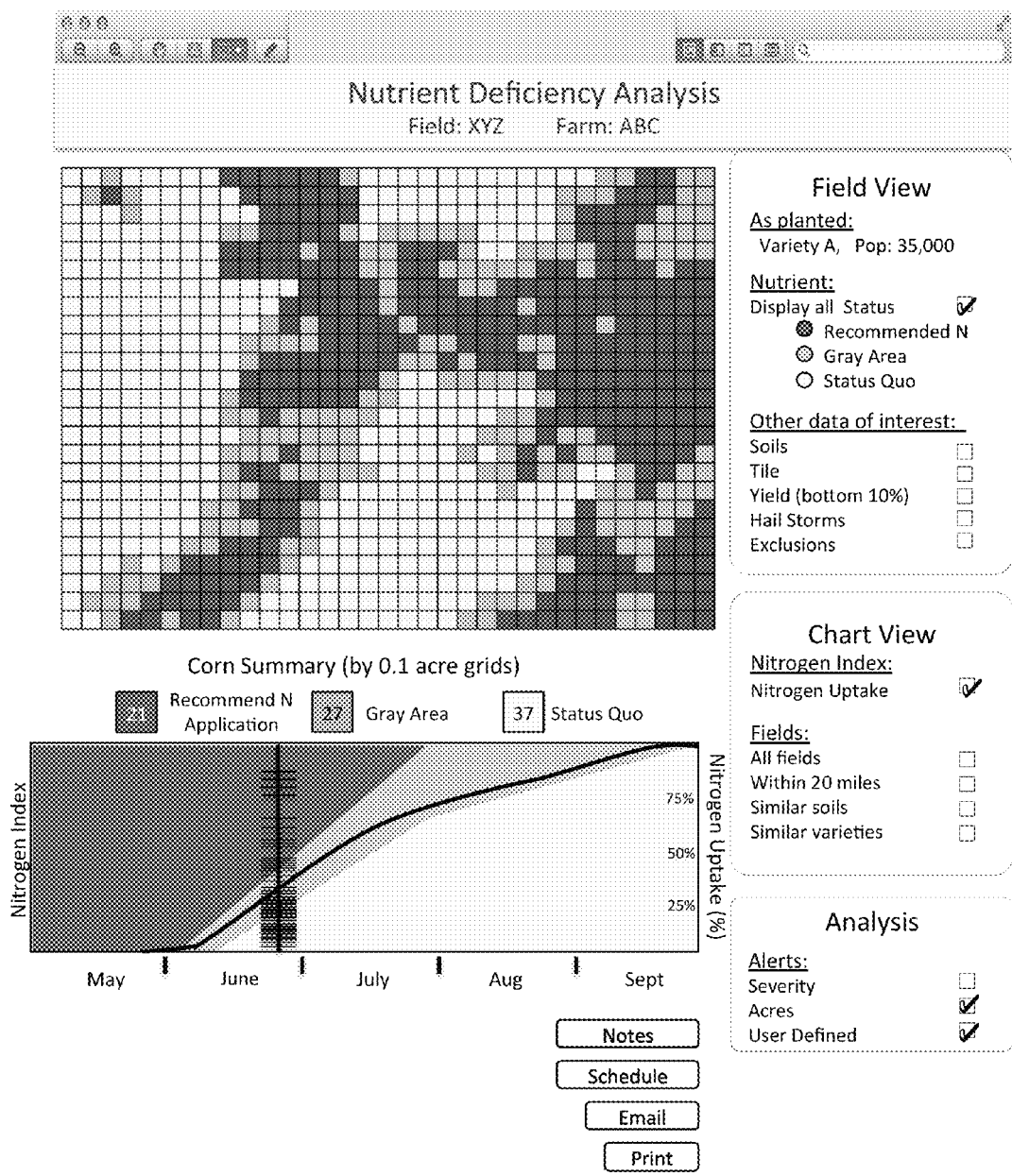

FIG. 10 illustrates an exemplary screen 1000 further detailing the type of information determined and provided by the crop status analyzer and alert generator. In this example, the content and controls are the same as those described with regard to FIG. 9 except that the exclusion layer data has been turned off and these areas are now included in the analysis.

Although no crop types have been specifically identified in this present document, it should be understood that the systems, apparatus, and processes disclosed herein may be applied to any type of crop.

While the foregoing has described what are considered to be the best mode and/or other examples of the present invention, it is understood that various modifications can be made therein and that the subject matter disclosed herein can be implemented in various forms and examples, and that the teachings can be applied in numerous applications, only some of which have been described herein.

What is claimed is:

1. A method comprising:

receiving, by a computer from a plurality of data sources, data associated with at least a portion of a field of plants, the data received from each of the plurality of data sources corresponding to a different one of a plurality of categories regarding a status of at least the portion of the field of plants, the plurality of categories including at least a crop stress category, an added fertility category, and a soils category, each of the plurality of categories associated with a plurality of category-specific sub-categories corresponding to data received from at least one of the plurality of data sources, wherein the crop stress category is associated with at least a near-infrared (NIR) imagery sub-category, wherein the added fertility category is associated with at least a frequency of nitrogen application sub-category, and wherein the soils category is associated with at least a soil texture category;

determining, by the computer, an overall score for the received data that indicates a nutrient status of at least the portion of the field of plants, wherein determining the overall score comprises:

determining a sub-category score for each of the plurality of sub-categories;

applying a weighting factor to each sub-category score to determine a plurality of weighted sub-category scores;

determining a sub-score for each category by aggregating the plurality of weighted sub-category scores corresponding to the respective category, each sub-score corresponding to a category-specific nutrient status of at least the portion of the field of plants;

applying a weighting factor to each of the sub-scores to determine a plurality of weighted sub-scores; and aggregating the plurality of weighted sub-scores to determine the overall score;
determining, by the computer, that the overall score satisfies a threshold value; and
outputting, by the computer, an alert in response to determining that the overall score satisfies the threshold value.

2. The method of claim 1, wherein receiving the data associated with at least the portion of the field of plants comprises receiving image data of at least the portion of the field of plants.

3. The method of claim 2, wherein receiving the image data comprises receiving the image data from an image sensor carried by an unmanned aerial vehicle (UAV).

4. The method of claim 1, wherein the plurality of categories further includes a drainage category, an improvements category, a weather impact on availability category, a management practices category, a production history category, and a planting category.

5. The method of claim 1, wherein the crop stress category is further associated with a normalized difference vegetative index (NDVI) sub-category, a chlorophyll indices sub-category, a color imagery sub-category, and a visual inspection sub-category.

6. The method of claim 1, wherein the added fertility category is further associated with a timing of nitrogen application sub-category, a starter fertilizer sub-category, a manure sub-category, a residue sub-category, and a nitrogen as applied sub-category.

7. The method of claim 1, wherein the soils category is further associated with a soil variability sub-category, a tillage sub-category, an organic matter sub-category, a pH sub-category, and a soil tilth sub-category.

8. The method of claim 1, wherein the alert is provided within a time period that enables a user to take corrective action to improve the status of at least the portion of the field of plants.

9. The method of claim 1, wherein determining that the overall score satisfies the threshold value comprises automatically comparing the overall score to at least one of a benchmark, a parameter, a previously determined overall score, and a baseline associated with at least the portion of the field of plants.

10. The method of claim 9, further comprising:
using at least one of the received data, the comparison, and the overall score to update at least one of the benchmark, the parameter, the previously determined overall score, and the baseline.

11. The method of claim 9, further comprising:
using at least one of the received data, the comparison, and the overall score to generate at least one of the benchmark, the parameter, the previously determined crop status, and the baseline.

12. The method of claim 9, further comprising:
storing at least one of the received data, the comparison, the overall score, and the alert in a database.

13. The method of claim 12, further comprising:
receiving, by the computer from the plurality of data sources, additional data associated with at least the portion of the field of plants;
accessing, by the computer, at least one of the stored received data, the comparison, the overall score, and the alert;
comparing, by the computer, the additional received data the accessed one of the stored received data, the comparison, the overall score, and the alert; and
determining, by the computer, a change in the overall score responsively to the comparison.

14. The method of claim 13, further comprising:
determining, by the computer, a trend in the overall score of responsively to the comparison.

15. The method of claim 1, further comprising:
receiving instructions from a user regarding how to process the received data; and
processing the received data according to the received instructions.

16. The method of claim 1, wherein the alert is generated upon an occurrence of at least one of a weather event, a detected presence of a pest, a detected presence of a pollutant, a detected water level, a detected level of damage to the plants, a detected level of stress to the plants, and a predicted yield from the plants.

17. The method of claim 1, wherein the threshold value is user configurable.

18. The method of claim 1, wherein receiving the data associated with at least the portion of the field of plants comprises receiving data from at least one of a user, a contact of the user, an in-season data gather source, a database, a data feed, an aerial sensor, an unmanned aerial vehicle (UAV), and a remote sensor via a communication network.

19. The method of claim 1, wherein the alert indicates a level of distress to plants within at least the portion of the field of plants.

20. The method of claim 1, wherein the alert indicates a location of distressed plants within at least the portion of the field of plants.

21. The method of claim 1, further comprising:
determining a recommendation responsively to determining that the overall score satisfies the threshold value, the recommendation providing one or more actions that may be taken to address subject matter of the alert.

22. The method of claim 1, further comprising:
tailoring the alert according to at least one of a user characteristic, a user preference, a type of alert, an amount by which the overall score exceeds the threshold value, and a type of the overall score.

23. The method of claim 1, wherein the alert includes at least one of the overall score, a visual representation of a location of plants that do not satisfy the threshold value, a visual representation of a trend of a status of the field of plants over a period of time, a chart showing one or more trends of a status of the field of plants, a visual display of locations of the field of plants excluded from status determinations, and a visually enhanced display of one or more portions of the received data as selected by a user.

24. The method of claim 1, wherein the alert includes received data for at least the portion of the field of plants received at different times.

25. The method of claim 1, wherein at least one of receiving the data associated with at least the portion of the field of plants and outputting the alert is executed via a social networking service.

26. A device comprising:
one or more processors; and
at least one storage device encoded with instructions that, when executed by the one or more processors, cause the one or more processors to:
determine an overall score for data received from a plurality of data sources and associated with at least a portion of a group of crops, each of the plurality of data sources corresponding to a different one of a plurality of categories regarding a status of at least the portion of the group of crops, the plurality of categories including at least a crop stress category, an added fertility category, and a soils category, each of the plurality of categories associated with a plurality of sub-categories, wherein the crop stress category is associated with at least a near-infrared (NIR) imagery sub-category, wherein the added fertility category is associated with at least a frequency of nitrogen application sub-category, wherein the soils category is associated with at least a soil texture category, and wherein determining the overall score comprises:
- determining a sub-category score for each of the plurality of sub-categories;
- applying a weighting factor to each sub-category score to determine a plurality of weighted sub-category scores;
- determining a sub-score for each category by aggregating the plurality of weighted sub-category scores corresponding to the respective category, each sub-score corresponding to a category-specific status of at least the portion of the group of crops;
- applying a weighting factor to each of the sub-scores to determine a plurality of weighted sub-scores; and
- aggregating the plurality of weighted sub-scores to determine the overall score; and
- output an alert in response to determining that the overall score satisfies a threshold value.

27. A system comprising:
at least one computer;
an image sensor; and
a Crop Status Analyzer and Alert Generator executable by the at least one computer and configured to:
- receive, from a plurality of data sources that includes the image sensor, data for at least a portion of a field of crops, the data received from each of the plurality of data sources corresponding to one of a plurality of categories regarding a status of at least the portion of the field of crops, the plurality of categories including at least a crop stress category, an added fertility category, and a soils category, each of the plurality of categories associated with a plurality of sub-categories, wherein the crop stress category is associated with at least a near-infrared (NIR) imagery sub-category, wherein the added fertility category is associated with at least a frequency of nitrogen application sub-category, and wherein the soils category is associated with at least a soil texture category;
- determine, based on the received data, an overall score corresponding to a nutrient status of at least the portion of the field of crops by at least determining a sub-category score for each of the plurality of sub-categories, applying a weighting factor to each sub-category score to determine a plurality of weighted sub-category scores, aggregating the plurality of weighted sub-category scores corresponding to the respective category to determine a sub-score for each category, applying a weighting factor to each of the sub-scores to determine a plurality of weighted sub-scores, and aggregating the plurality of weighted sub-scores to determine the overall score;
- determine that the overall score is not included within a range of acceptable overall scores; and
- output an alert in response to determining that the overall score is not included within a range of acceptable overall scores.

28. A method comprising:
receiving, by a computer from a plurality of data sources, data corresponding to crops, the data received from each of the plurality of data sources corresponding to a different one of a plurality of categories, the plurality of categories including at least a crop stress category, an added fertility category, and a soils category, each of the plurality of categories associated with one or more sub-categories, wherein the crop stress category is associated with at least a near-infrared (NIR) imagery sub-category, wherein the added fertility category is associated with at least a frequency of nitrogen application sub-category, and wherein the soils category is associated with at least a soil texture category;
determining, by the computer, a category score for each category based on an aggregation of weighted sub-category scores corresponding to each sub-category associated with a respective category;
applying, by the computer, a weight to each category score;
aggregating, by the computer, the weighted category scores to determine a crop status score; and
outputting, by the computer, an alert in response to determining that the crop status score satisfies a threshold value.

* * * * *